US012722901B2

(12) United States Patent
Vulpetti et al.

(10) Patent No.: US 12,722,901 B2
(45) Date of Patent: Sep. 1, 2026

(54) CONVEYOR COMPONENT WITH FLEXIBLE HUB AND CONVEYOR ASSEMBLY

(71) Applicant: Laitram, L.L.C., Harahan, LA (US)

(72) Inventors: Matthew Vulpetti, Metairie, LA (US); Ryan Hale, New Orleans, LA (US); Jake A. Mohan, Grand Rapids, MI (US)

(73) Assignee: Laitram, L.L.C., Harahan, LA (US)

(*) Notice: Subject to any disclaimer, the term of this patent is extended or adjusted under 35 U.S.C. 154(b) by 97 days.

(21) Appl. No.: 18/805,882

(22) Filed: Aug. 15, 2024

(65) Prior Publication Data

US 2024/0400312 A1 Dec. 5, 2024

Related U.S. Application Data

(63) Continuation-in-part of application No. 18/712,063, filed as application No. PCT/US2022/050091 on Nov. 16, 2022, now Pat. No. 12,570,475.

(60) Provisional application No. 63/575,964, filed on Apr. 8, 2024, provisional application No. 63/533,216, filed on Aug. 17, 2023, provisional application No. 63/285,112, filed on Dec. 2, 2021.

(51) Int. Cl.
*B65G 23/04* (2006.01)
*B65G 39/04* (2006.01)

(52) U.S. Cl.
CPC ............. *B65G 23/04* (2013.01); *B65G 39/04* (2013.01)

(58) Field of Classification Search
None
See application file for complete search history.

(56) References Cited

U.S. PATENT DOCUMENTS 4,495,683 A 1/1985 Delhaes
5,316,522 A * 5/1994 Carbone ................ F16H 55/12 474/903
6,086,495 A 7/2000 Stebnicki et al.
9,422,026 B1 8/2016 Cody
(Continued)

FOREIGN PATENT DOCUMENTS

JP 2008-168997 A 7/2008
JP 2013001522 A 1/2013
(Continued)

OTHER PUBLICATIONS

Extended European Search Report, European Application No. 22902017.7, mailed Nov. 25, 2025, European Patent Office, Munich, Germany.
(Continued)

*Primary Examiner* — Kavel Singh
(74) *Attorney, Agent, or Firm* — Catherine M. Bishop

(57) ABSTRACT

A conveyor component for use in a conveyor includes a flexible hub for mounting a shaft and a continuous rim connected to the flexible hub for contacting a conveyor belt. The flexible hub includes a peripheral gap that can be widened using an expansion tool to enlarge a shaft-receiving opening formed by the flexible hub. A flexible finger terminating in a positioning tab on a radially inner surface of the flexible hub moves into engagement with a groove on the shaft when the conveyor component is in a relaxed state and out of engagement with the groove when the flexible hub is flexed.

19 Claims, 39 Drawing Sheets

(56) References Cited

U.S. PATENT DOCUMENTS

| | | | |
|---|---|---|---|
| 9,598,244 B2 | 3/2017 | Snabb et al. | |
| 9,751,697 B2 | 9/2017 | Ma | |
| 10,605,347 B2 | 3/2020 | Larson | |
| 11,130,638 B2 | 9/2021 | Westergaard Andersen | |
| 11,873,172 B2 * | 1/2024 | DeGroot ................ | B65G 33/32 |
| 2005/0061633 A1 | 3/2005 | Vetter | |
| 2010/0242649 A1 | 9/2010 | Vandewal et al. | |
| 2016/0236749 A1 | 8/2016 | Cody | |
| 2019/0112129 A1 | 4/2019 | Batchelder et al. | |
| 2020/0207548 A1 | 7/2020 | Kokx | |

FOREIGN PATENT DOCUMENTS

| | | |
|---|---|---|
| WO | 2023102094 A1 | 6/2023 |
| WO | 2023121469 A1 | 6/2023 |

OTHER PUBLICATIONS

International Search Report and Written Opinion of the International Searching Authority, PCT/US2024/042422, mailed Nov. 25, 2024, Korean Intellectual Property Office, Daejeon, Republic of Korea.

Non-Final Rejection from priority application, U.S. Appl. No. 18/712,063, mailed Sep. 11, 2025, United States Patent and Trademark Office, Alexandria, Virginia, US.

* cited by examiner 551
550
65 PD
INTRALOX
500
540
534
535
533
532
520
531
S800
540

536
534
537
518
538
535
539
INTRALOX
512
520

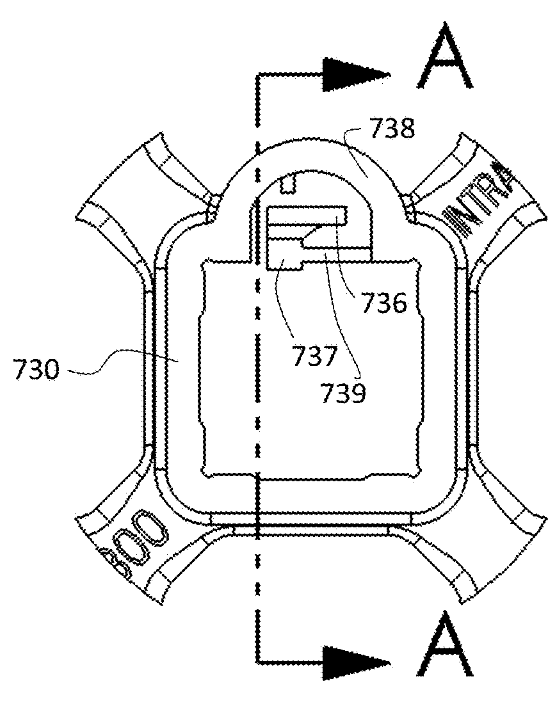
FIG. 50A
736
737
730
SECTION A-A
FIG. 50B
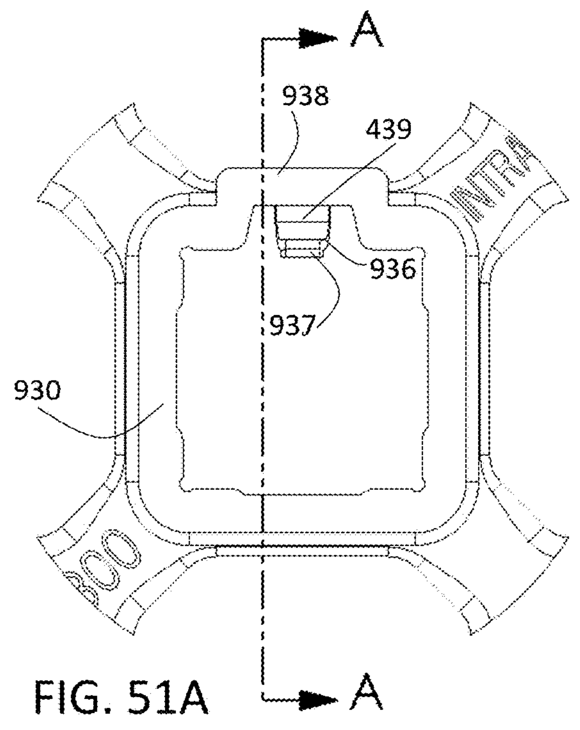
FIG. 51A
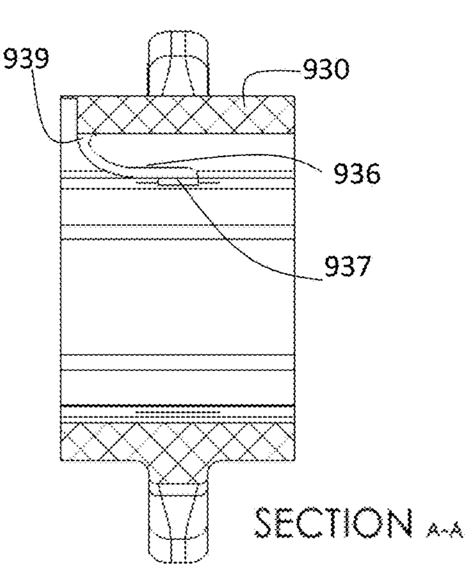
FIG. 51B

SECTION A-A 1000
1038
1042
1040
1050
1051
1037
1041

1000
1042
1041
1038
1039
1037

1100
1142
1182
1136
1137
1120

1100
1142
1182
1120
1137

1200
1236
1220
1246

1200
1246
1236

1236
1200
1246

CONVEYOR COMPONENT WITH FLEXIBLE HUB AND CONVEYOR ASSEMBLY

RELATED APPLICATIONS

The present application is a Continuation-in-Part of U.S. patent application Ser. No. 18/712,063, entitled “Conveyor Component with Flexible Hub and Conveyor Assembly”, which is a 371 of International Patent Application PCT/US2022/050091, which claims priority to U.S. Provisional Patent Application 63/285,112, filed Dec. 2, 2021, and entitled “Conveyor Roller and Conveyor Roller Assembly”, the contents of which are herein incorporated by reference. The present application also claims priority to US Provisional Patent Application No. 63/533,216, filed Aug. 17, 2023 and U.S. Provisional Patent Application No. 63/575,964 filed Apr. 8, 2024, both entitled “Conveyor Component with Flexible Hub and Conveyor Assembly” and incorporated herein by reference.

FIELD OF THE INVENTION

The present application relates to power-driven conveyors. More particular, the present invention relates conveyor components, such as rollers and sprockets used to support and—or drive a conveyor belt in a returnway, infeed or another location.

BACKGROUND OF THE INVENTION

Conveyor belts are used in many industries to convey products from a first location to a second location. Conveyor belts generally form an endless belt loop that is trained around drive and idler sprockets or rollers at each end of a conveying path. Articles conveyed atop the conveyor belt are supported along an upper carryway. The conveyor belt returns along a lower returnway. To minimize the maximum sag of the conveyor belt in the returnway, return shoes or rollers are often used. Return rollers typically extend across the width of the conveyor belt at selected positions along the returnway. Rollers may also be used to support a conveyor belt at the infeed end of the endless conveyor belt circuit and—or another location. Mounting rollers, sprockets and other components on a shaft in a conveyor can be difficult and cumbersome. In addition, separate locking components are often required to secure the component in a fixed axial position along the shaft.

SUMMARY OF THE INVENTION

A conveyor component for use in a conveyor includes a flexible hub forming an expandable shaft opening for receiving a shaft and a continuous rim connected to the flexible hub for contacting a conveyor belt. The flexible hub includes a peripheral gap to allow expansion of the shaft opening to facilitate installation onto and removal from the shaft. Axial tabs may interlock with a groove on the peripheral surface of the shaft to secure the conveyor component on the shaft in a relaxed, operating position. A flexible hub in a conveyor component may include with a locking tab on a flexible finger for selectively locking the conveyor component to a groove on a shaft. The flexible finger can be lifted to disengage the locking tab from the groove and allow the conveyor component to slide axially along the shaft for removal and—or repositioning.

According to one aspect, a component for a conveyor comprises a hub for receiving a shaft, the hub including a flexible finger with a locking tab for engaging a recess on the shaft and a rim connected to the flexible hub, the rim having a continuous periphery for contacting a conveyor belt.

According to another aspect, a conveyor assembly comprises an axially-extending shaft, the shaft including a peripheral recess in a first face and a component mounted to the shaft, the component including a hub for receiving a shaft, the hub including a flexible finger with a locking tab for engaging the peripheral recess on the shaft and a rim connected to the flexible hub, the rim having a continuous periphery for contacting a conveyor belt.

BRIEF DESCRIPTION OF THE DRAWINGS

FIG. 50A is a detailed front view of the hub of the sprocket of FIG. 46;

FIG. 50B is a cross-sectional view through lines A-A of the hub of FIG. 50A;

FIG. 51A is a detailed front view of a hub of a conveyor component according to another embodiment;

FIG. 51B is a cross-sectional view through lines A-A of the hub of FIG. 51A.

DETAILED DESCRIPTION

A conveyor component includes a flexible hub connected to a rim. The conveyor component can be a roller, sprocket or any suitable shaft-mounted conveyor component. The invention will be described below relative to certain illustrative embodiments, though those skilled in the art will recognize that the invention is not limited to the described embodiments.

Figures 1, 2:
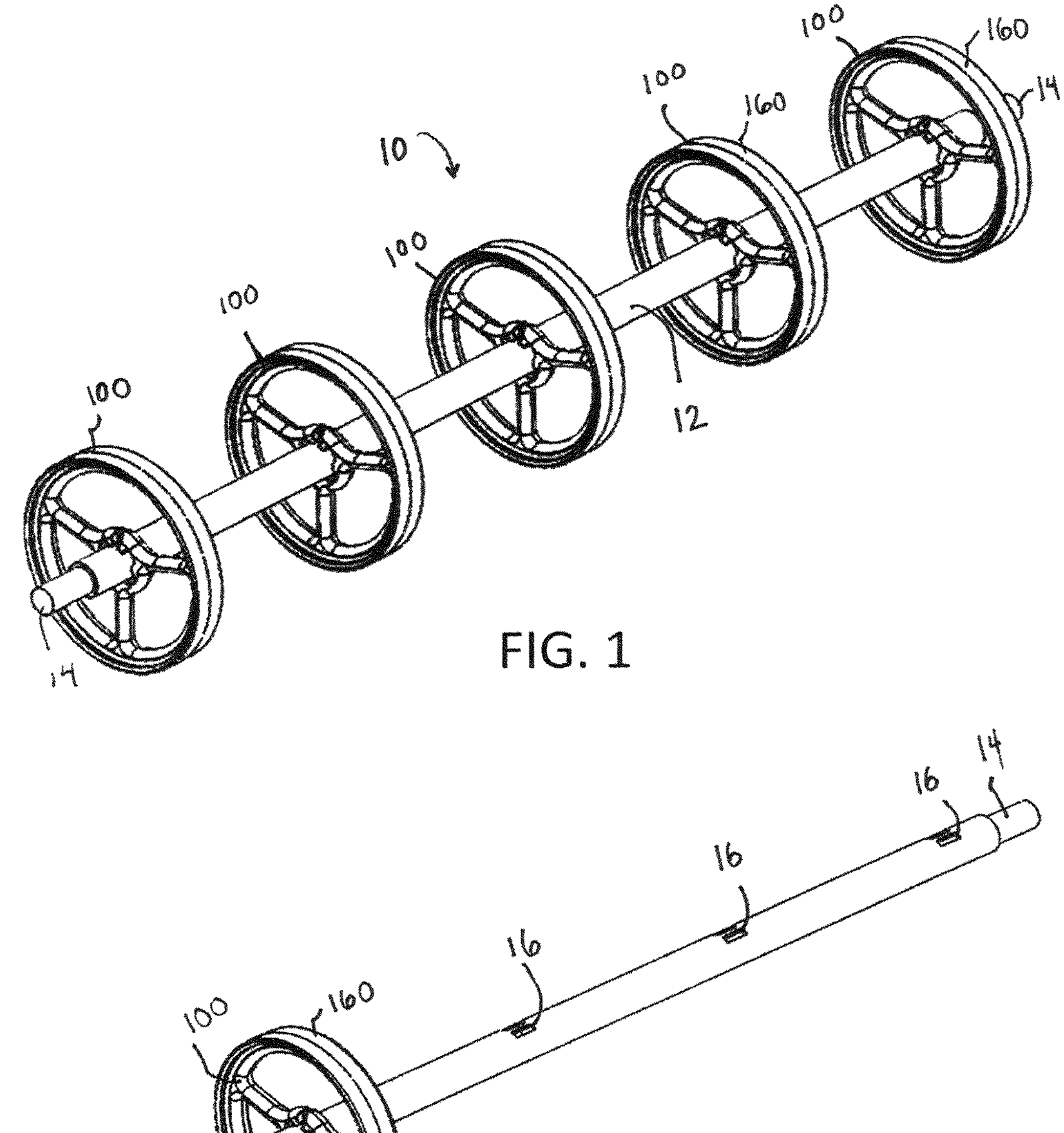
FIG. 1 is an isometric view of a roller assembly for a conveyor.
FIG. 2 is an isometric view of the roller assembly of FIG. 1, with some rollers removed.
Figures 3, 4:
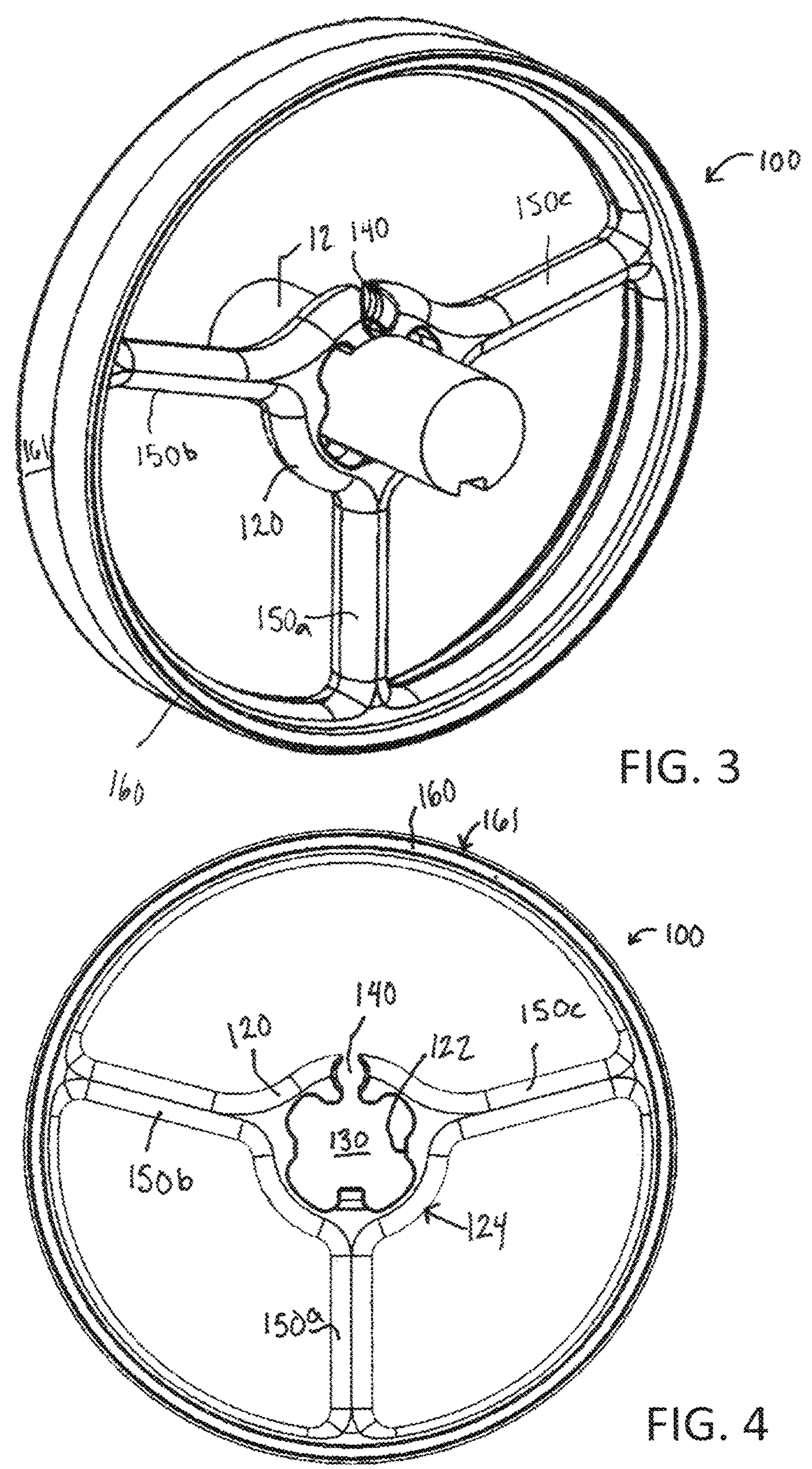
FIG. 3 is an isometric view of a roller with a flexible hub mounted on a shaft.
FIG. 4 is a front view of the roller of FIG. 3.

Referring to FIGS. 1-2, a conveyor roller assembly 10 comprises a series of conveyor rollers 100 mounted on a mounting shaft 12 in a conveyor. The illustrative series of conveyor rollers 100 are evenly spaced along the axial length of the mounting shaft, but the invention is not so limited, and any number conveyor rollers 100 can be mounted in any suitable location and—or patterns. In one embodiment, the conveyor rollers are returnway rollers, mounted in the returnway of a conveyor for guiding and—or supporting the conveyor belt as it travels from the outfeed, discharge end, back to the infeed of the conveyor. As the conveyor belt moves over the outer rims 160 of the conveyor rollers 100, it may spin the conveyor roller assembly 100. The illustrative rollers 100 are fixedly mounted to the mounting shaft 12 during operation, with end journals 14 inserted in bearings or saddles to allow spinning of the whole assembly 100 in unison. One skilled in the art will recognize that the illustrative conveyor roller assembly may be implemented in any suitable location in a conveyor, such as the infeed or other suitable location where support of a conveyor belt is useful.

The rollers 100 may comprise flexible hubs to facilitate mounting and dismounting of the respective roller on the mounting shaft 12. As described below, grooves 16 in the peripheral surface of the mounting shaft 12 in mounting regions engage locking tabs on the rollers to prevent or limit migration of the rollers along the axial length of the mounting shaft 12.

The grooves 16 may be sized to fix the rollers or allow floating of the rollers along the mounting shaft 12.

Referring to FIGS. 3-6, an illustrative conveyor roller 100 comprises a flexible hub 120 forming an expandable shaft opening 130 for receiving the mounting shaft. The flexible hub 120 includes a radially inner surface 122 forming the expandable shaft opening 130 and a radially outer surface 124. Spokes 150 extend radially from the radially outer surface 124 of the hub 120 and connect the hub 120 to an outer rim 160, the outer surface 161 of which contacts and supports a conveyor belt. The outer rim 160 is continuous and forms a closed periphery. An outside surface 161 of the outer rim 160 contacts a conveyor belt. In one embodiment, the roller 100 can be a sprocket with peripheral teeth on the outer rim 160 for driving a conveyor belt.

The illustrative expandable shaft opening 130 is circular in cross-section but the invention is not so limited. For example, the expandable shaft opening can be square to accommodate a square shaft, or have any suitable size, shape and configuration to accommodate any suitable size, shape and configuration of a shaft.

The flexible hub 120 includes a peripheral gap 140 to allow selective expansion of the expandable opening 130. In a relaxed, operating state, the flexible hub 120 snaps onto the shaft 12, with bearing surfaces on the radially inner surface 122 bearing against the shaft outer surface. The radially inner surface 122 can include cleaning recesses so that bearing surfaces only contact a portion of the periphery of the shaft. When the peripheral gap 140 is widened, the shaft opening 130 enlarges to pull at least some of the bearing surfaces away from the shaft 12 to allow axial sliding of the shaft 12 relative to the roller.

The illustrative flexible hub 120 includes radially inwards-extending positioning tabs 152, 154 that engage a peripheral groove 16 on the shaft 12 to secure the axial position of the roller 100 on the shaft. The illustrative positioning tabs 152, 154 are formed adjacent a radially inner end of the peripheral gap 140, but the invention is not so limited. When the flexible hub is in a relaxed state, the positioning tabs 152, 154 engage and are inserted in the groove 16. When the flexible hub is in a flexed, expanded state, the positioning tabs 152, 154 disengage from the peripheral groove 16 to allow axial sliding of the roller 100 relative to the shaft 13 for mounting, removal and—or repositioning.

The illustrative peripheral gap 140 in the flexible hub 120 is formed by confronting end faces 142, 144. The illustrative end faces 142, 144 have a concave shape to form a substantially cylindrical-shaped gap 140, but the invention is not so limited. The shaped end faces 142, 144 have radially outer tips intersecting the hub outer surface 124 and radially inner tips that transition to the positioning tabs 152, 154. The size, shape and configuration of the peripheral gap 140 enables widening of the peripheral gap 140 by separating the end faces 142, 144 while preventing migration of the shaft 12 from the shaft opening 130. Even in a fully flexed, open state, the gap 140 is significantly smaller than the shaft 12 to contain the shaft 12 within the shaft opening 130 while enabling sliding of the shaft 12 relative to the shaft opening 130.

Figure 5:
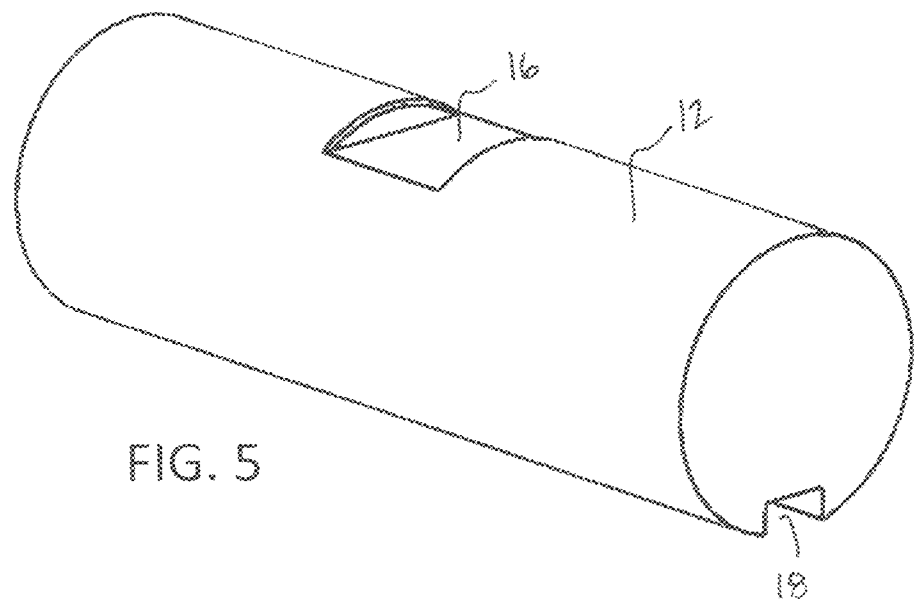
FIG. 5 is an isometric view of the shaft of FIG. 3.
Figure 6:
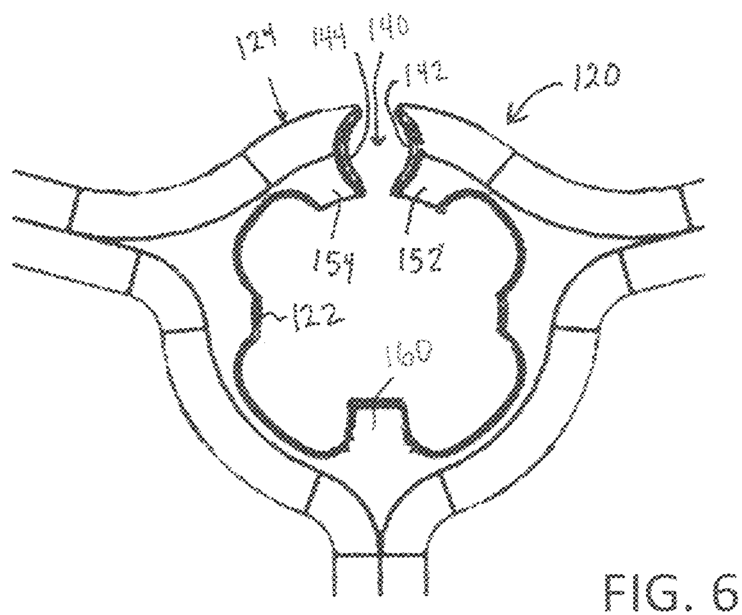
FIG. 6 is a detailed view of the flexible hub of the roller of FIG. 4.

The illustrative flexible hub 120 further includes a key 160 opposite the peripheral gap 140 configured to be received in a keyway 18 on the shaft 12 (as shown in FIG. 5) to facilitate seating of the shaft 12 in the expandable shaft opening 130. The key 160 allows the shaft 12 to selectively slide through the expandable opening 130 while securing the radial position of the roller 100 relative to the shaft 12.

The flexible hub 120 is formed of a resilient material that allows separation of the legs forming the peripheral gap 140 to enlarge the shaft opening 130 upon application of a certain amount of force to disengage from the shaft 12. When the force is removed, the flexible hub 120 snaps back into a relaxed state with a smaller shaft opening 130 that engages the shaft 12, with the positioning tabs 152, 154 inserted in the peripheral groove 16. However, even when fully flexed, the widened peripheral gap 140 prevent radial migration of the shaft 12 from the shaft opening 130.

The illustrative conveyor roller 100 includes three spokes 150, but the invention is not so limited. For example, fewer or more spokes may be used to connect the flexible hub 120 to the rim 160. Alternatively, webbing or another suitable connector may connect the hub 110 to the rim 160, or portions or all of the flexible hubs may be integral with the rim 110. An illustrative first spoke **150*a* extends from the outer surface 124 of the flexible hub opposite the peripheral gap 140 toward the rim 160. A second spoke 150*b* extends from the outer surface 124 of the flexible hub between the first spoke 150*a* and the peripheral gap 140**.

A third spoke **150*c* extends from the outer surface 124 of the flexible hub between the first spoke and the peripheral gap and separated from the first spoke and third spoke by more than 90°. The radial distance between the second and third spokes 150*b*, 150*c* is larger than the radial distance between the first spoke 150*a* and second spoke 150*b* and the radial distance between the first spoke 150*a* and the third spoke 150*c***.

Figure 7:
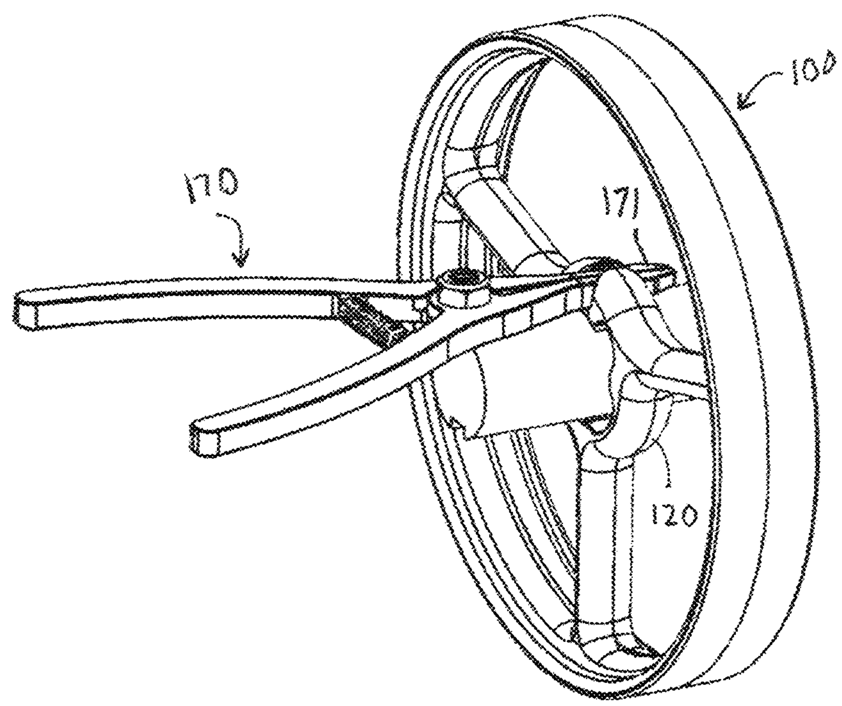
FIG. 7 shows the roller and shaft of FIG. 3 during removal of the shaft using an expansion tool.
Figure 8:
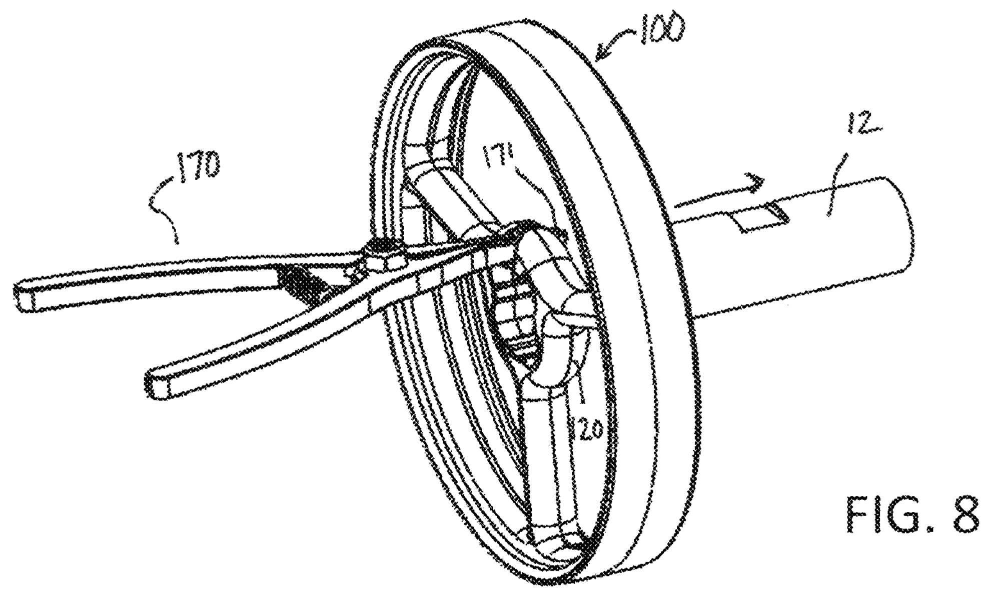
FIG. 8 shows the roller and shaft of FIG. 7 after removal of the shaft.

As shown in FIGS. 7 and 8, an expansion tool 170 can be used to selectively enlarge the peripheral gap 140 and shaft opening 130 to allow insertion, removal and—or sliding of a shaft 12 into, from and relative to the roller 100. The illustrative expansion tool 170 comprises snap ring pliers having spreadable tips 171. The spreadable tips 171 can be inserted into the peripheral gap 140 of a locked roller 100, as shown in FIG. 7. Then, a user spreads the tips 171 to widen the peripheral gap 140, enlarge the shaft opening 130 and pull the positioning tabs 152, 154 out of the peripheral groove 16. With the shaft opening enlarged 130, the user can pull the shaft 12 from the roller 100 in the axial direction. Once the expansion tool 170 is removed, the flexible hub 120 snaps back into the relaxed position, constricting the shaft opening 130 and peripheral gap 140. To mount a roller 100 on the shaft, the expansion tool can be inserted into the peripheral gap 140 and activated to enlarge the shaft opening 130. In the expanded position, a shaft 12 can slide into the flexible hub 120. When the positioning tabs 152, 154 are above the peripheral groove 16, the expansion tool 170 can be removed, causing the flexible hub 120 to snap into an engaged, locked position on the shaft 12.

Figures 9, 10:
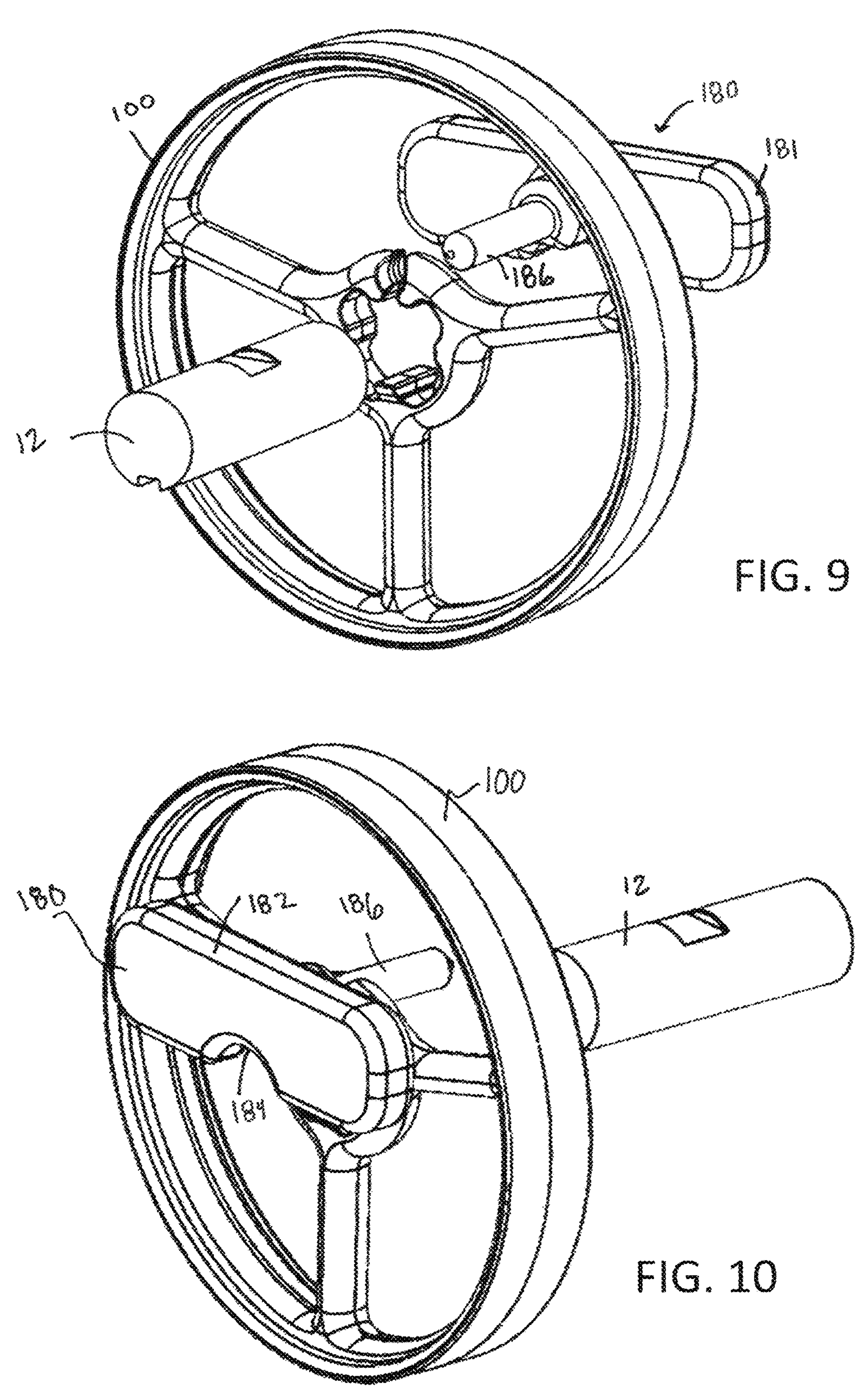
FIG. 9 shows an expansion tool and roller with a flexible hub according to another embodiment.
FIG. 10 shows the expansion tool and roller of FIG. 9 with the expansion tool in an engaged position.

FIGS. 9 and 10 show another embodiment of an expansion tool 180 suitable for selectively expanding a flexible hub 120 of a roller 100. The expansion tool 180 includes a handle 182 having a recess 184 in a bottom edge for accommodating the top of the shaft 12. An expansion rod 186 extends from the handle 182 and is configured to be inserted in the peripheral gap 140 to widen the gap and expand the shaft opening 130 to allow the shaft 12 to slide therethrough.

Figure 11:
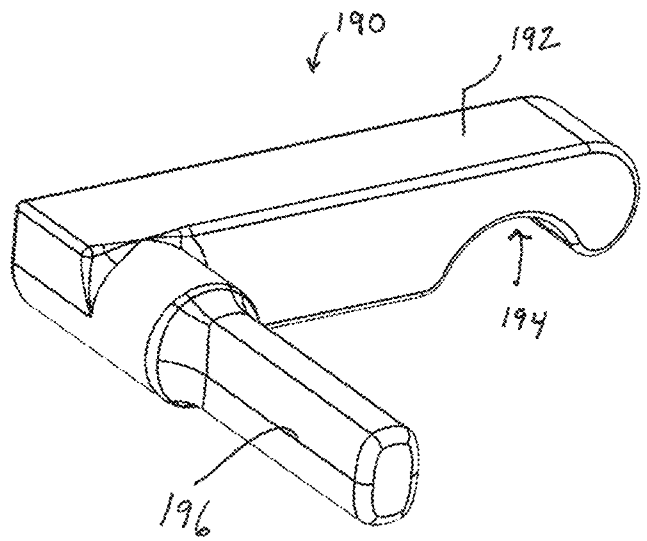
FIG. 11 shows another embodiment of an expansion tool suitable for use with a conveyor component with a flexible hub.

Any suitable means for selectively enlarging the shaft opening 130 by widening the peripheral gap 140 can be used. For example, FIG. 11 shoes an embodiment of an expansion tool 190 suitable for selectively expanding a flexible hub of a roller, sprocket or other conveyor component. The expansion tool 190 includes a handle 192, which may include a recess 194, and an oblong shaft 196 extending perpendicular to the handle for expanding the gap 140 to enlarge a flexible hub of a conveyor component. The oblong shaft 196 can be inserted into the gap 140, then rotated to expand the gap 140.

Figure 12:
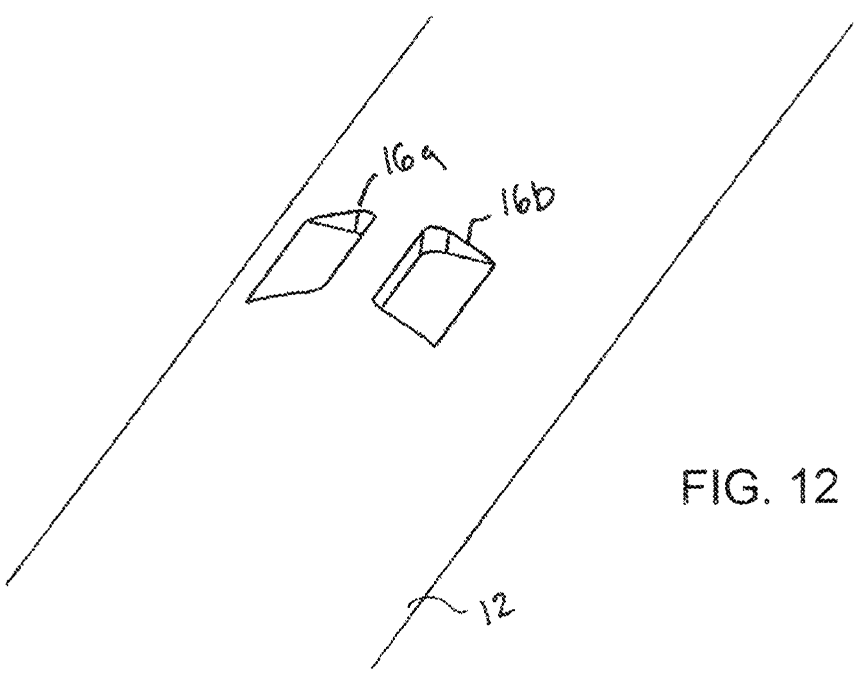
FIG. 12 is an isometric detailed view of a mounting portion of a shaft suitable for mounting a roller with a flexible hub according to another embodiment.

In another embodiment, shown in FIG. 12, the peripheral groove 16 on the shaft 12 for accommodating the roller 100 comprises two notches 16*a*, 16*b*, each configured to receive and constrain a positioning tab 152, 154.

In one embodiment, the peripheral groove 16 or notches 16*a*, 16*b* can be longer than the positioning tabs 152, 154 to allow the roller 100 to float along a selected mounting region of the shaft 12.

Figure 13:
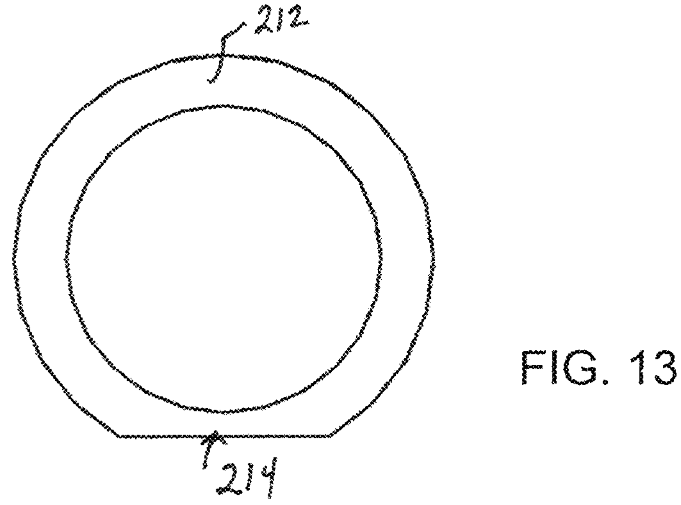
FIG. 13 is a front view of a shaft for a roller with a flexible hub according to another embodiment.
Figure 14:
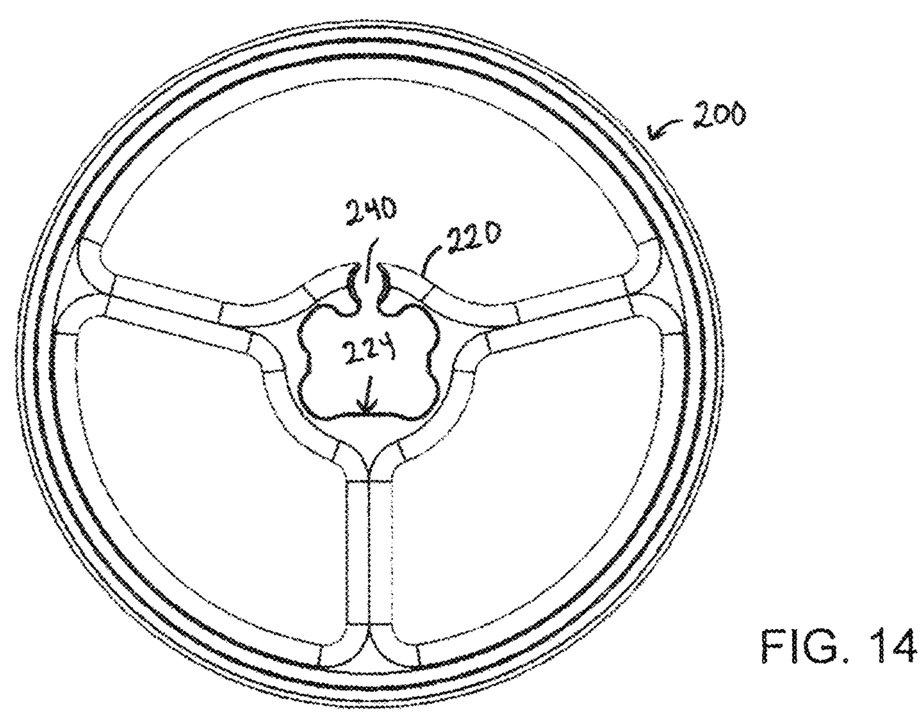
FIG. 14 is a front view of a roller suitable for mounting the shaft of FIG. 13.
Figure 15:
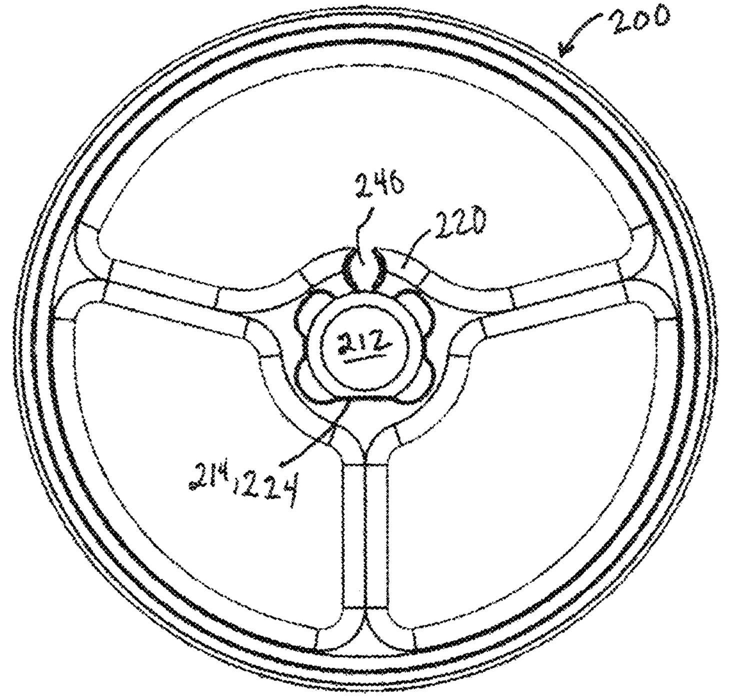
FIG. 15 is a front view of an assembly comprising the roller of FIG. 14 mounted on the shaft of FIG. 13.

Referring to FIGS. 13-15, in another embodiment, a roller 200 with a flexible hub 220 includes a flat radially-inward facing surface 224 opposite an expandable peripheral gap 240. An associated mounting shaft 212 has a flat bottom surface 214 that bears against the flat surface 224 of the flexible hub 220. The interfacing flat surfaces 214, 224 allow axial sliding of the shaft 212 and flexible hub 220 relative to each other when the flexible hub 220 is in an expanded position while locking the relative radial positions of the roller 200 and shaft 212 relative to each other when the roller 200 is in an engaged position.

Figures 16, 17, 18:
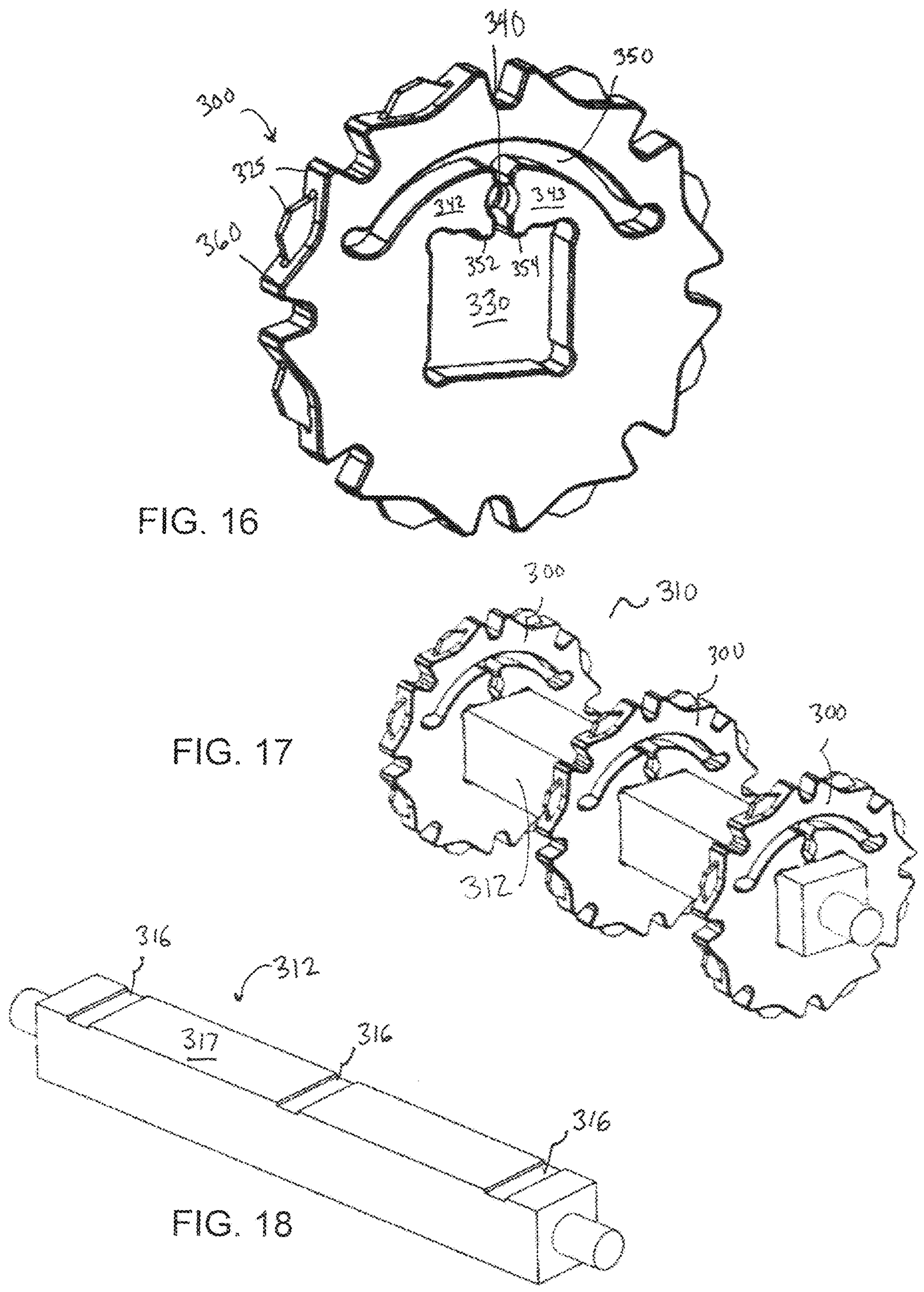
FIG. 16 is an isometric view of a roller having a flexible hub forming a sprocket according to another embodiment.
FIG. 17 is an isometric view of a sprocket assembly including sprockets shown in FIG. 16.
FIG. 18 is an isometric view of the shaft used in the sprocket assembly of FIG. 17.

In another embodiment, shown in FIG. 16, a sprocket 300 includes a flexible hub forming a square-shaped shaft opening 330 including a peripheral gap 340 formed by confronting, flexible legs 342, 343 including radially inwards extending tabs 352, 354. The periphery 360 of the sprocket 300 includes drive teeth 325 for driving a conveyor belt. The body of the sprocket 300 extends radially inwards from the periphery to form the shaft opening 330. A curved slot 350 separates the periphery 360 from the legs 342, 343 to impart flexibility to the legs 342, 343 to allow widening of the opening 330 when a tool is inserted to enlarge the peripheral gap 340. As described above, enlarging the peripheral gap 340 widens the shaft opening 330 to allow a shaft to move therethrough until a mounting portion of the shaft is aligned with tabs 352, 354. Then, the tool can be removed to snap the sprocket 300 onto the shaft such that the tabs 352, 354 are inserted in a peripheral groove on the shaft.

FIG. 17 shows a sprocket assembly 310 including a plurality of sprockets 300 mounted on a shaft 312 having a square cross-section. Each sprocket is mounted in a mounting region of the shaft 312. As shown in FIG. 18, the illustrative shaft 312 includes a groove 316 in each mounting region. The illustrative groove 316 is uniform in depth and axial length and extends across the width of the latching surface 317, but the shaft 312 can have any suitable configuration for mounting a sprocket with a flexible hub. For example, some grooves 316 may be sized to prevent axial movement of the sprocket, while others may be sized to allow a certain amount of float of the associated sprocket along the shaft 312.

Figure 19:
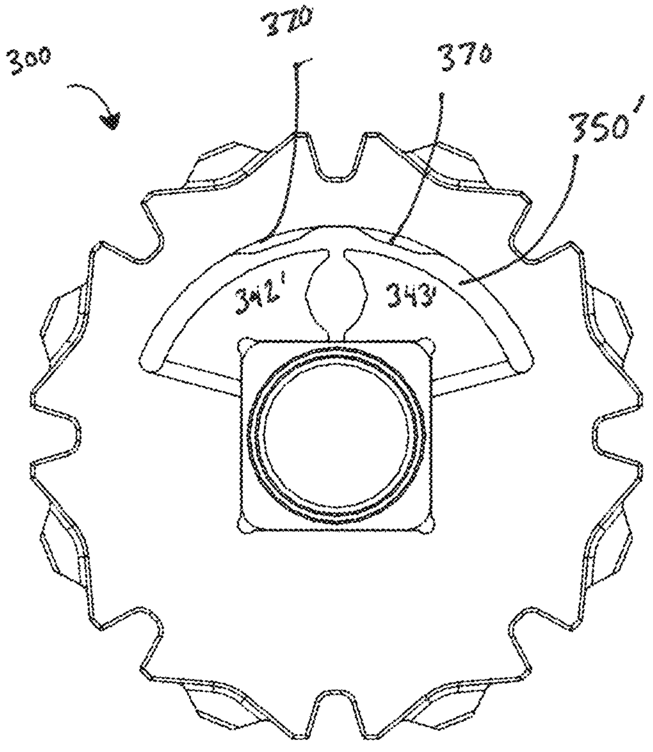
FIG. 19 is a front view of a sprocket with a flexible hub including stopping protrusions according to another embodiment.

In another embodiment, a component, such as a sprocket 300' with a flexible hub, may include stopping protrusions 370 in a curved slot 350' to limit the flexing of the legs 342', 343' to prevent or reduce breakage, as shown in FIG. 19.

Figure 20:
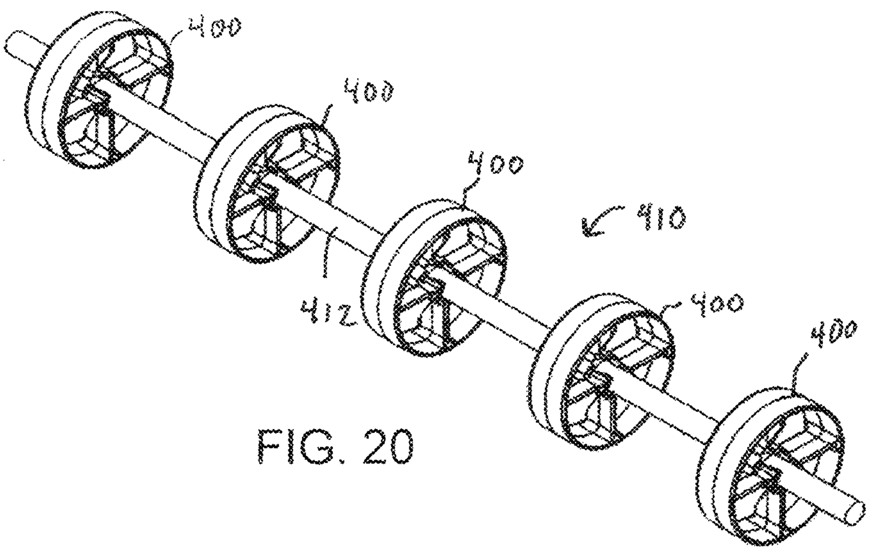
FIG. 20 is an isometric view of a roller assembly including rollers having flexible hubs according to another embodiment.
Figure 21:
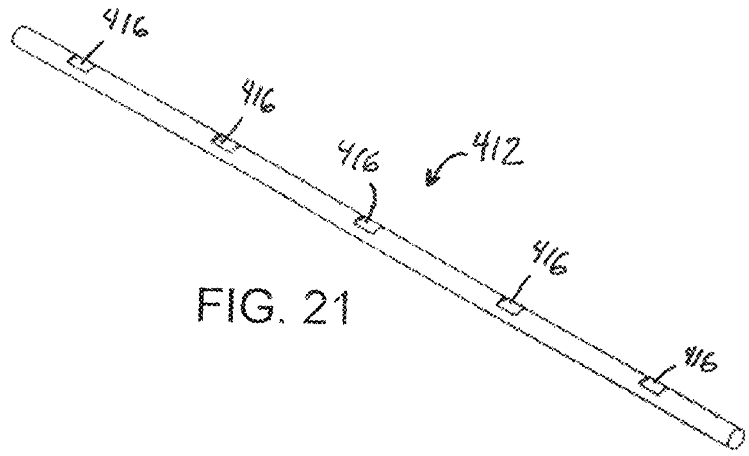
FIG. 21 is an isometric view of a shaft suitable for use in the roller assembly of FIG. 20.
Figure 22:
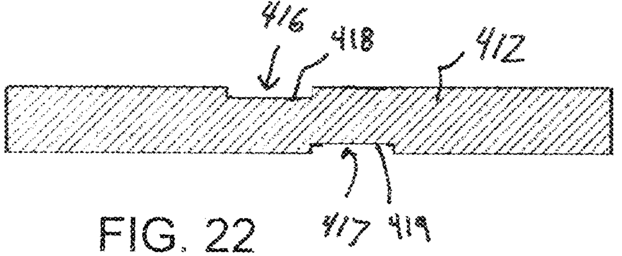
FIG. 22 is a cross-sectional view of the shaft of FIG. 21.

FIG. 20 shows another embodiment of a roller assembly 410 including a series of conveyor rollers 400 mounted on a mounting shaft 412 in a conveyor. The rollers 400 may comprise flexible hubs to facilitate mounting and dismounting of the respective roller on the mounting shaft 412. As shown in FIGS. 21 and 22, the illustrative mounting shaft 412 has a main portion that has a circular cross-section. In each mounting region, the shaft 412 includes offset and opposing grooves 416, 417 in the peripheral surface of the mounting shaft 412. Each groove 416, 417 includes a flat bottom surface 418, 419 to seat flat radially inner surfaces on an associated roller 400 to prevent or limit migration of the roller along the axial length of the mounting shaft 412, as described below.

As shown in FIGS. 23-26, the illustrative conveyor roller 400 comprises a flexible hub 420 for mounting a shaft 412. The roller 400 includes a rim 460 having a continuous and closed periphery. Spokes, webbing or another connecting means connect the flexible hub 420 to the rim 460. Alternatively, the body between the flexible hub 420 and rim 460 may be solid or otherwise configured. In the illustrative embodiment, the roller 400 includes four equally spaced apart spokes 471, 472, 473, 474 connecting the flexible hub 420 to the rim 460, but the invention is not so limited.

Figure 26:
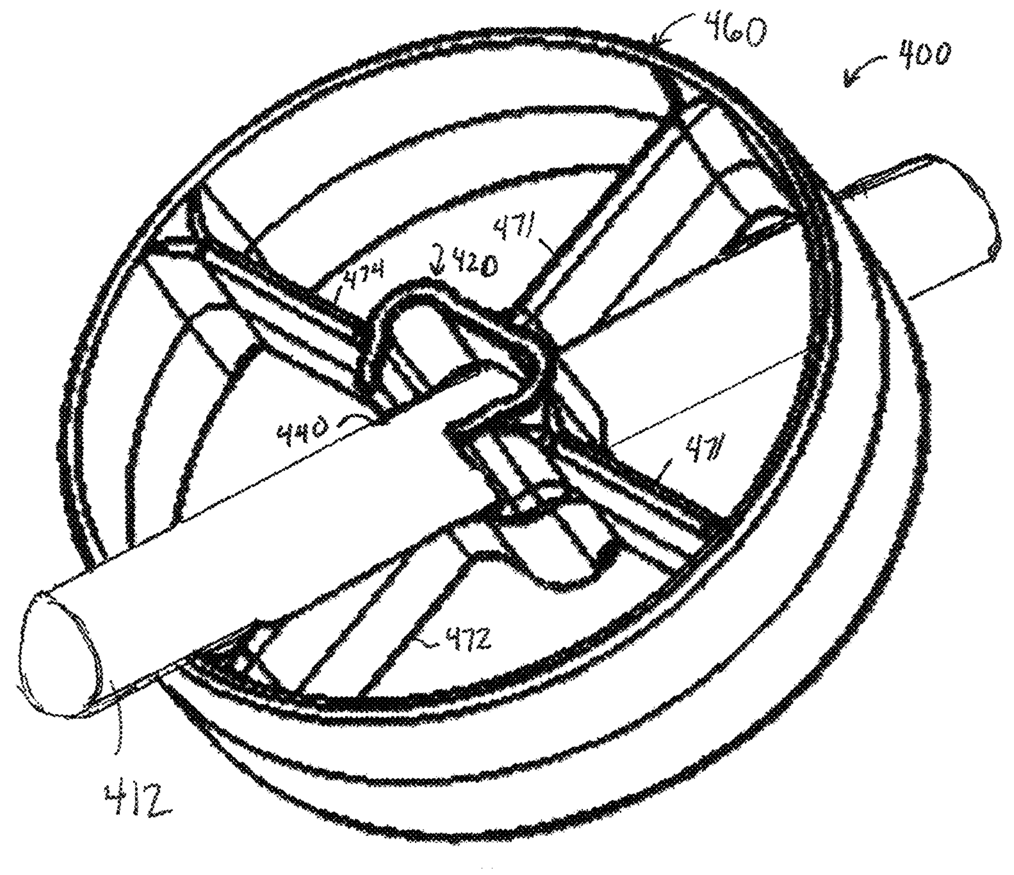
FIG. 26 is an isometric view of the roller of FIG. 23, showing the oblique shaft mounting opening.
Figures 27, 28, 29:
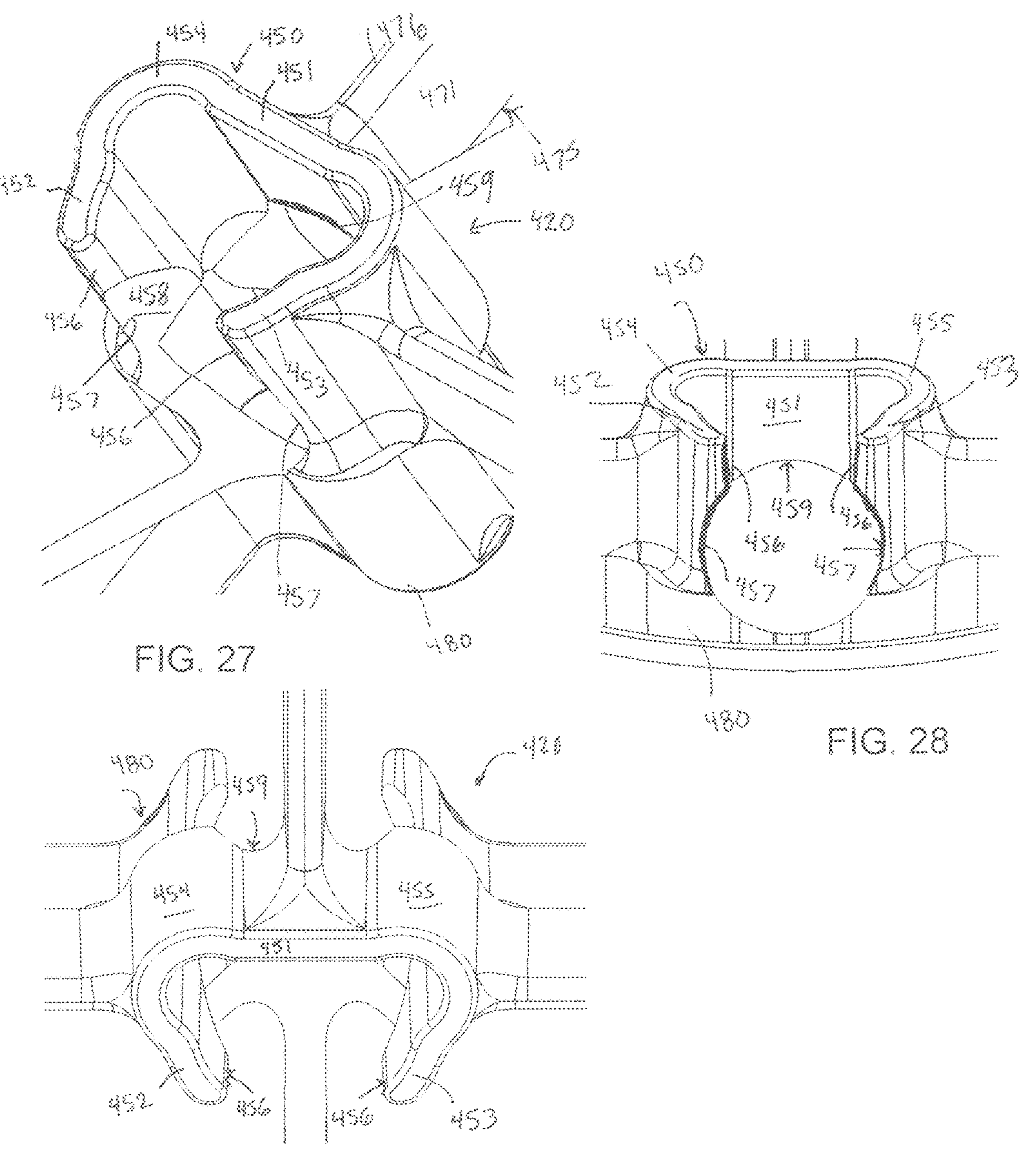
FIG. 27 is a detailed isometric view of the flexible hub of the roller of FIG. 23.
FIG. 28 is another detailed view of the flexible hub of FIG. 27.
FIG. 29 is a top isometric view of the flexible hub of FIG. 27.
Figure 30:
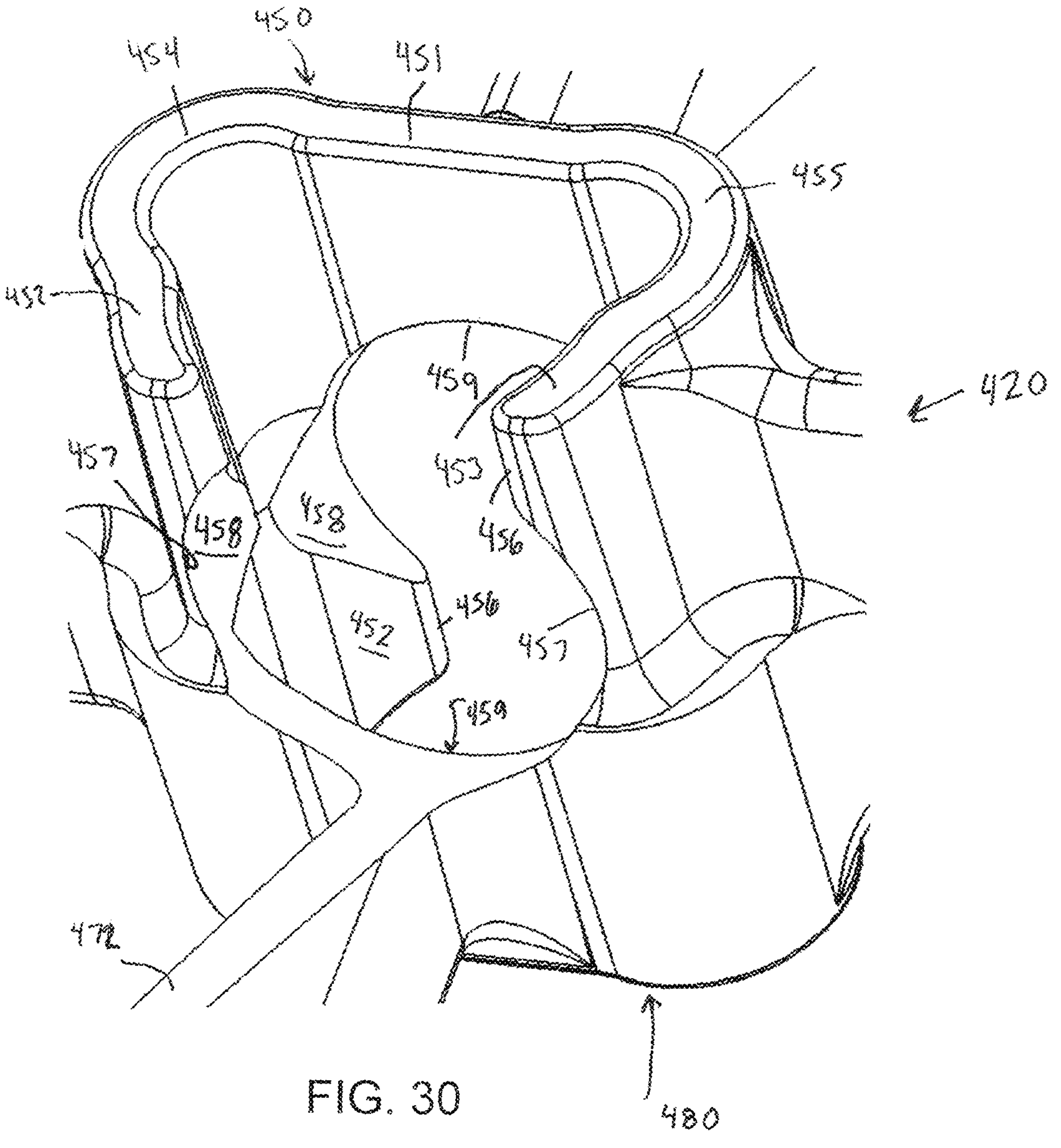
FIG. 30 is another detailed view of the flexible hub of FIG. 27.

The flexible hub 420 includes radially inner surfaces forming an axially-extending shaft opening 430 for mounting the shaft 412 in an operating position. The axially-extending shaft opening 430 has non-uniform, non-circular cross-section to seat an associated shaft 412 in a particular position and orientation. The axially-extending shaft opening 430 includes two expandable peripheral gaps to allow insertion of the shaft into the flexible hub. The axially-extending shaft opening does not allow passage of the shaft therethrough when the shaft extends axially relative to the roller 400 in an operation position. The flexible hub 420 includes radially inner surfaces forming an oblique mounting opening 440 having a circular cross section and extending along an axis that is oblique to the longitudinal axis of the shaft for initially inserting the shaft 412 into the flexible hub 420, as shown in FIG. 26. When angled to match the oblique mounting opening 440, the shaft can pass through the flexible hub 420.

Referring to FIGS. 27-30, the illustrative flexible hub 420 comprises a first clamping portion 450 on a first axial end of the flexible hub 420 opening in a first radial direction. The first clamping portion 450 comprises a flat end wall 451 configured to abut a flat bottom surface 418 on the shaft 412 when in the operating position. Tapering, shaped legs 452, 453 connect to the flat end wall 451 via curved connecting walls 454, 455. The illustrative tapering, shaped legs 452, 453 have inner surfaces that are slightly concavely-curved and form a slight bump at an intersection with the curved connecting walls 454, 455. The tapering, shaped legs 452, 453 can be flexible to selectively widen the opening (peripheral gap) therebetween to allow insertion of a shaft.

The tips of the tapering, shaped legs 452, 453 include axially outer straight edges 456 and curved axially inner edges 457 defining edges of the oblique mounting opening 440. Curved, shaped surfaces 458 extend tangentially from the curved axially inner surfaces 457 to form bearing surfaces for the oblique mounting opening 440.

An axially inner edge of the flat end wall 451 includes a curved recess 459 extending in two dimensions that also defines a boundary of the oblique mounting opening 440. The axially-outer edge of the illustrative first clamping portion 450 extends in one plane, but the invention is not so limited.

The flexible hub 420 further includes a second clamping portion 480 on a second axial end of the flexible hub 420 opening in a second radial direction opposite the first radial direction. The axially inner ends of the first and second clamping portions 450, 480 abut and are integral with each other. The second clamping portion 480 is identical in configuration to the first clamping portion 460, except rotated 180° so that the flexible hub 420 is axially symmetric about an axis of symmetry S (shown in FIG. 25) bisecting the flexible hub 420. The second clamping portion 480 cooperates with the first clamping portion 450 to define the non-uniform shaft opening 430 and the oblique mounting opening 440.

Figures 23, 24, 25:
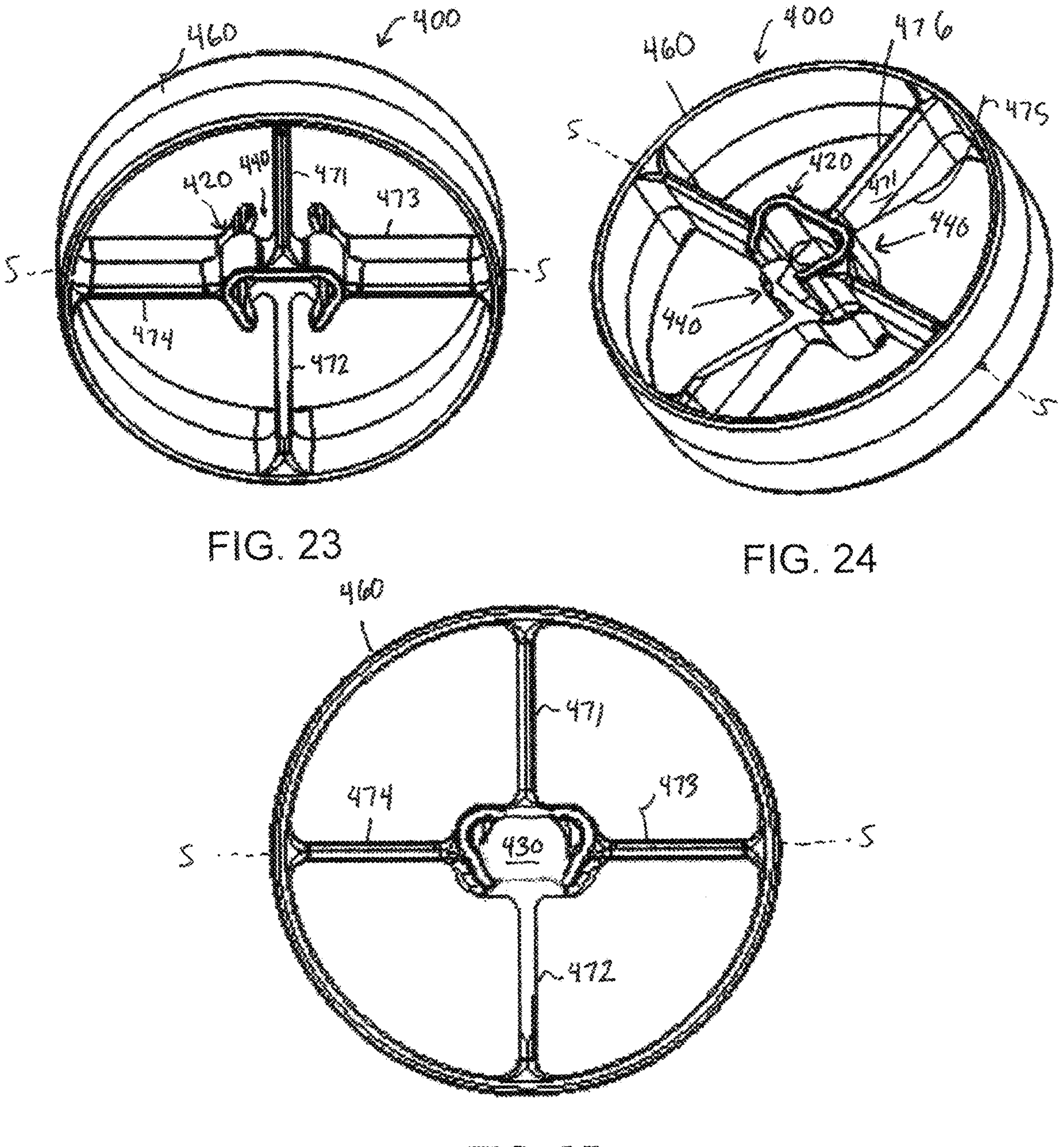
FIG. 23 is a top-front view of a roller including a flexible hub according to an embodiment.
FIG. 24 is an isometric view of the roller of FIG. 23.
FIG. 25 is a front view of the roller of FIG. 23.

As best shown in FIG. 24, a first spoke 471 extending from the rim 460 and intersecting an outer surface of the flat end wall 451 includes an oblique inner surface 475 forming another bearing surface for the oblique mounting opening 440. The illustrative axial outer surface 476 of the first spoke 471 extends radially, so that the first spoke 471 tapers from the rim 460 to the flexible hub 420, but the invention is not so limited.

A second spoke 472 extends from an outer surface of the second clamping portion flat end wall 451 and includes an oblique inner surface parallel to the oblique inner surface 471 and cooperating to further define the oblique mounting opening 440.

Third and fourth spokes 473, 474 extend radially from the outer walls of the clamping portions 450, 480 to further connect the flexible hub 420 to the rim 460, but the invention is not so limited.

Figure 31:
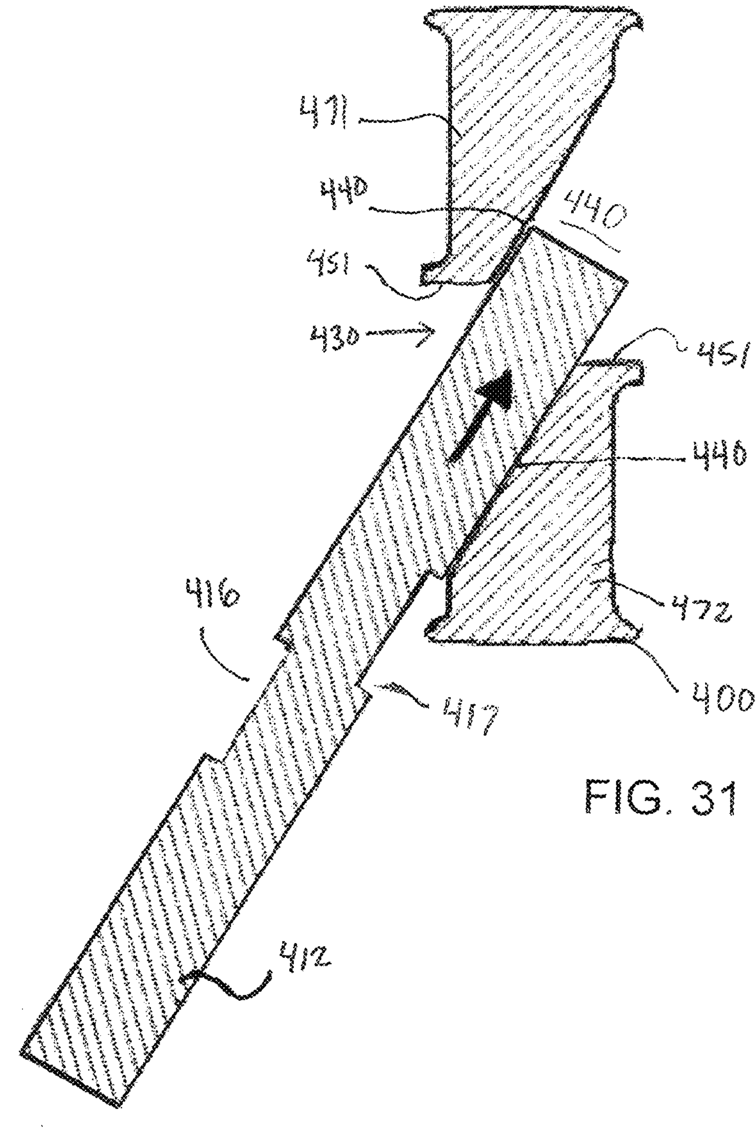
FIG. 31 is a cross-sectional view of the roller of FIG. 23 during insertion of a shaft.
Figure 32:
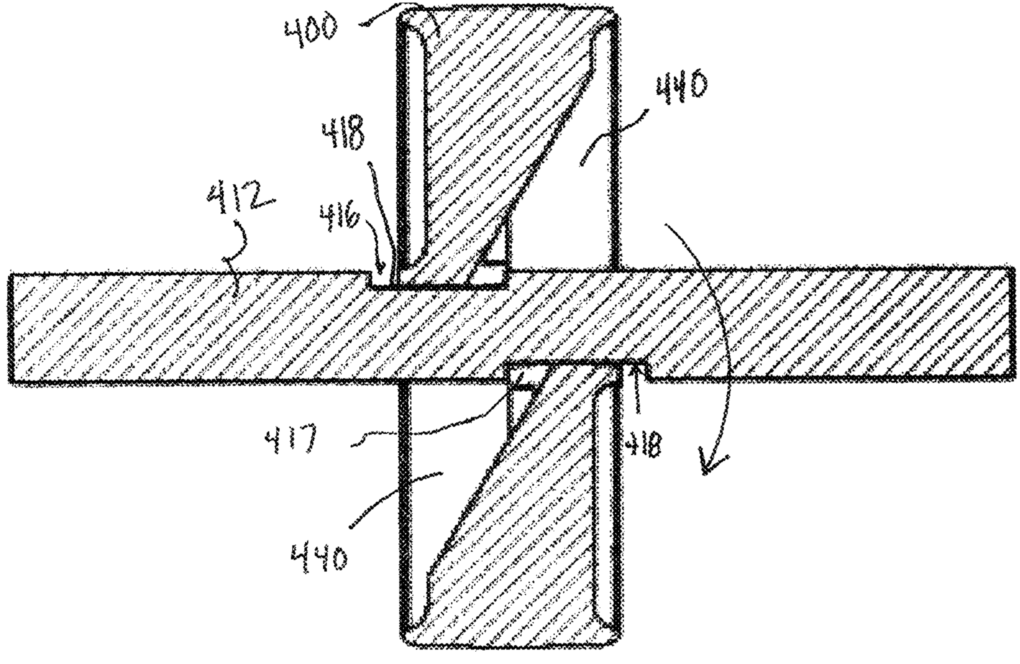
FIG. 32 is a cross-sectional view of the roller of FIG. 23 after the roller is mounted on the shaft.

To mount the roller 400 on a corresponding shaft 412, the roller 400 is first angled to align the oblique mounting opening 440 with the shaft 412. Then, as shown in FIG. 31, the shaft 412 slides through the oblique opening 440 until the shaft grooves 416, 417 are below the flat end walls 451 of the flexible hub 420. As shown in FIG. 32, the roller is then rotated about the shaft (or the shaft relative to the roller), bringing the shaft 412 into contact with the bottoms of the clamping portions 450, 480 forming the flexible hubs. Further rotation of the shaft forces open the clamping portions, separating the tapering, shaped legs 452, 454, pushing the shaft 412 into the axially-extending shaft opening 430. The shaft snaps into place within the clamping portions 350, 380, such that the flat surfaces 418 of the grooves 416, 417 abut the flat end walls 451 of the clamping portion 450, 480, with the tapering, shaped legs seating the body of the shaft.

Figures 33, 34, 35:
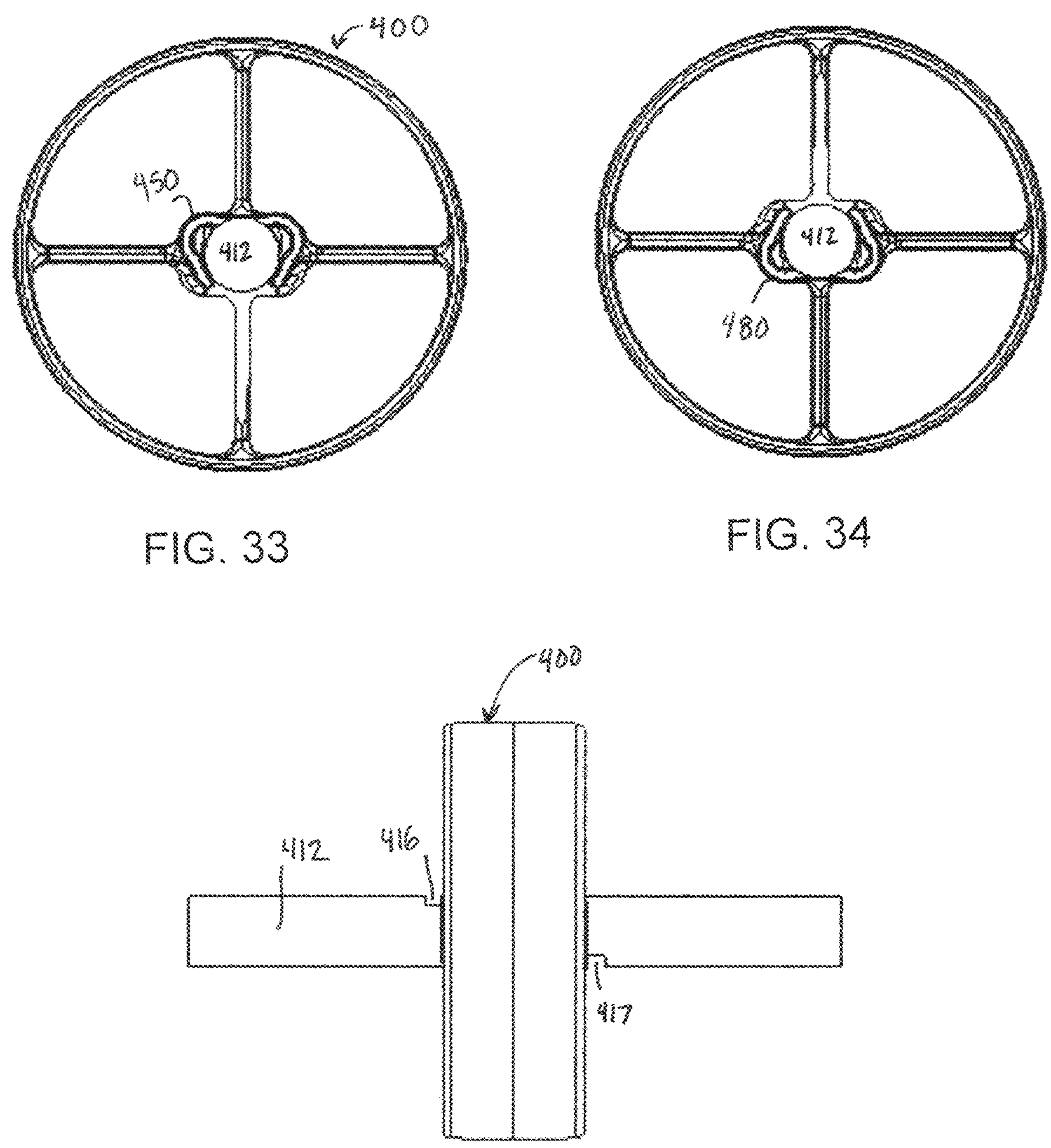
FIG. 33 is a front view of the roller and shaft of FIG. 32.
FIG. 34 is a side view of the roller and shaft of FIG. 32.
FIG. 35 is a rear view of the roller and shaft of FIG. 32.

FIGS. 33-35 show a roller 400 mounted on a mounting region of the shaft 412 and constrained by the interaction between the clamping portions 350, 380 and grooves 416, 417.

Figure 36:
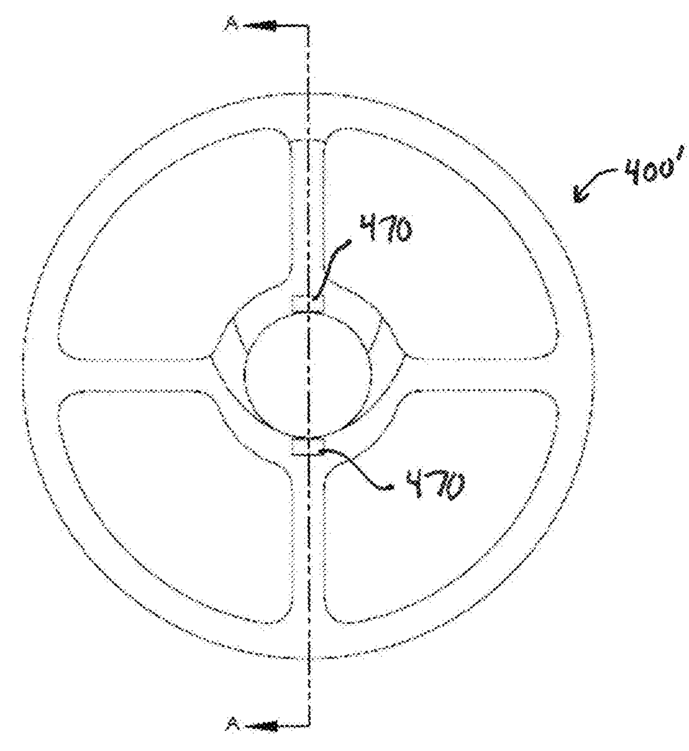
FIG. 36 is a front view of a roller with a flexible hub having magnets according to another embodiment.
Figure 37:
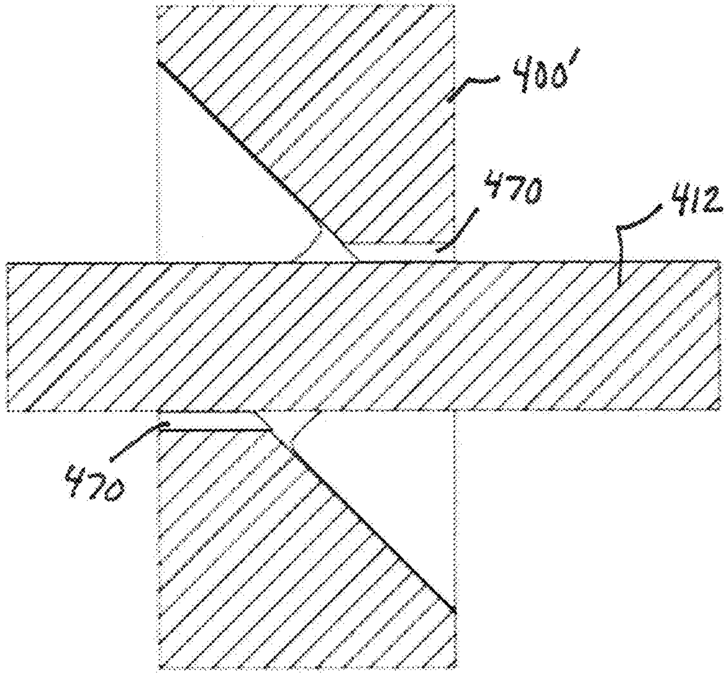
FIG. 37 is a cross-sectional view through line A-A of the roller of FIG. 36.

In another embodiment, shown in FIGS. 36-37, a roller 400' with a flexible hub includes magnets 470 for latching the shaft 412, which is formed of a magnetically-attractive material, in a locked position.

Figures 38, 39:
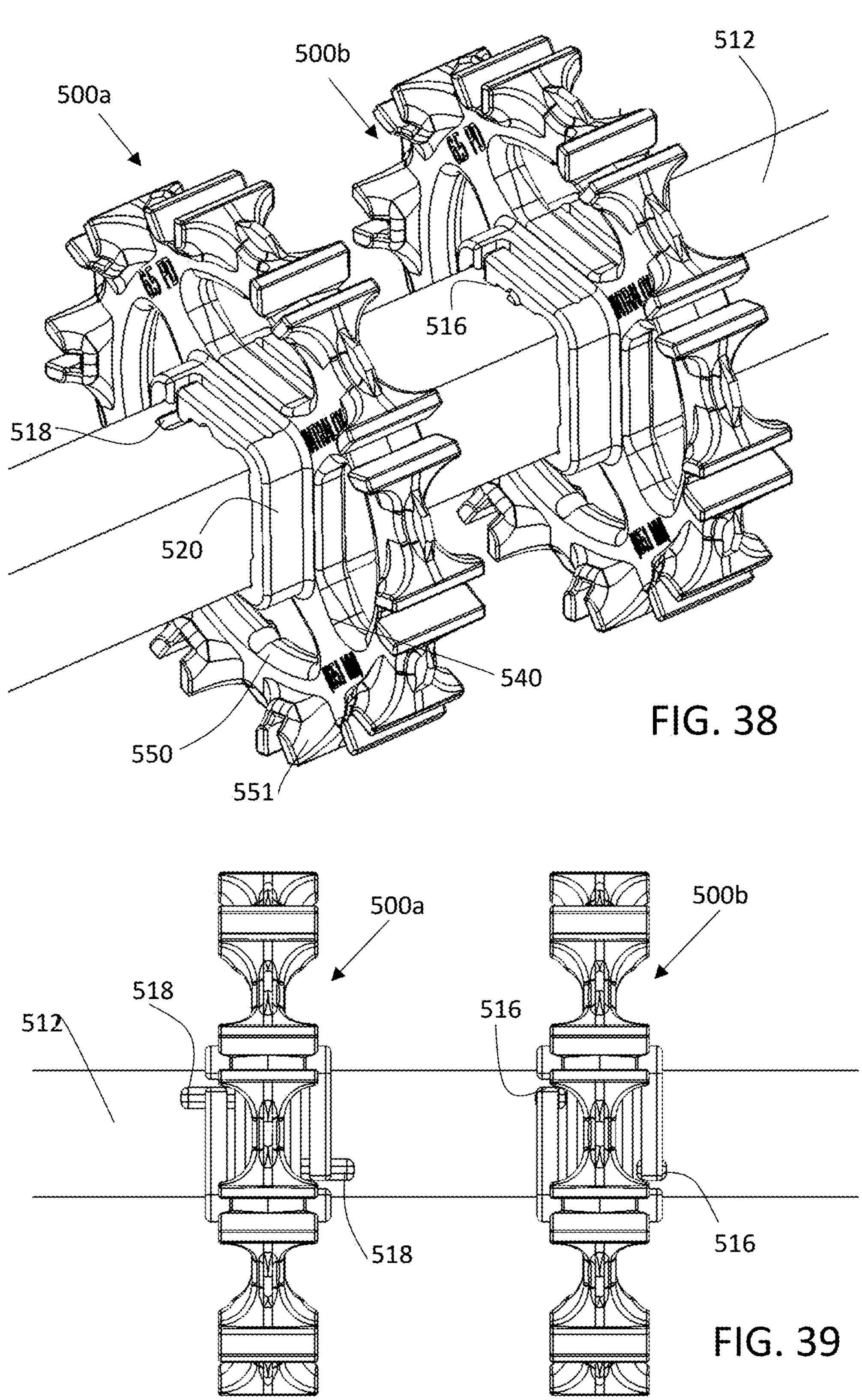
FIG. 38 is an isometric view of a sprocket assembly including sprockets with flexible hubs according to an embodiment.
FIG. 39 is an end view of the sprocket assembly of FIG. 38.

Referring to FIGS. 38-39, a conveyor sprocket assembly 510 comprises a series of conveyor sprockets 500 mounted on a mounting shaft 512 in a conveyor. The illustrative series of conveyor sprockets 500 are evenly spaced along the axial length of the mounting shaft, but the invention is not so limited, and any number conveyor sprockets 500 can be mounted in any suitable location, configuration and—or pattern. In the illustrative assembly, a first sprocket **500*a* is mounting in a floating position on the shaft: fixed rotationally, while enabling the sprocket to shift axially a certain degree along the shaft 512. A second sprocket 500*b* is fixed both axially and rotationally to the shaft 512**.

The sprockets 500 may comprise flexible hubs 520 to facilitate mounting and dismounting of the respective sprocket on the mounting shaft 512 and to provide axial location and containment of the sprockets. As described below, sets of grooves in the peripheral surface of the mounting shaft 512 in mounting regions engage movable locking tabs on the flexible hubs 520 to prevent or limit migration of the sprockets along the axial length of the mounting shaft 512. Each flexible hub is connected to the periphery 550 of the sprocket 500 by a connector, shown as spokes 540. The connector can be a webbing, solid portion or any suitable connector. The illustrative spokes 540 radiate from the corners of the flexible hub 520, but can have a different orientation, size, number and—or pattern. The illustrative periphery 550 includes drive structure 551 for driving a conveyor belt, but can alternatively be smooth or have another design. The illustrative periphery is 550 is continuous and forms a closed rim for the sprocket.

Different sized shaft grooves control the amount of axial float and—or the locking location of the sprockets. A first set of grooves 16 may be sized to fix an associated sprocket and prevent axial movement of an associated sprocket along the shaft 512, while a second set of grooves 518 may be elongated to allow a certain amount of floating of the associated sprocket along the mounting shaft 512. The grooves 516, 518 may be machined or otherwise formed in desired locations on the shaft 512.

The flexible hub 520 forms a shaft opening for receiving the mounting shaft 512. The flexible hub includes a flexible latching portion for locking the sprocket to the shaft, as well as non-flexing portions. The flexible latching portion can be moved to release the sprocket from the shaft.

Figures 40, 41:
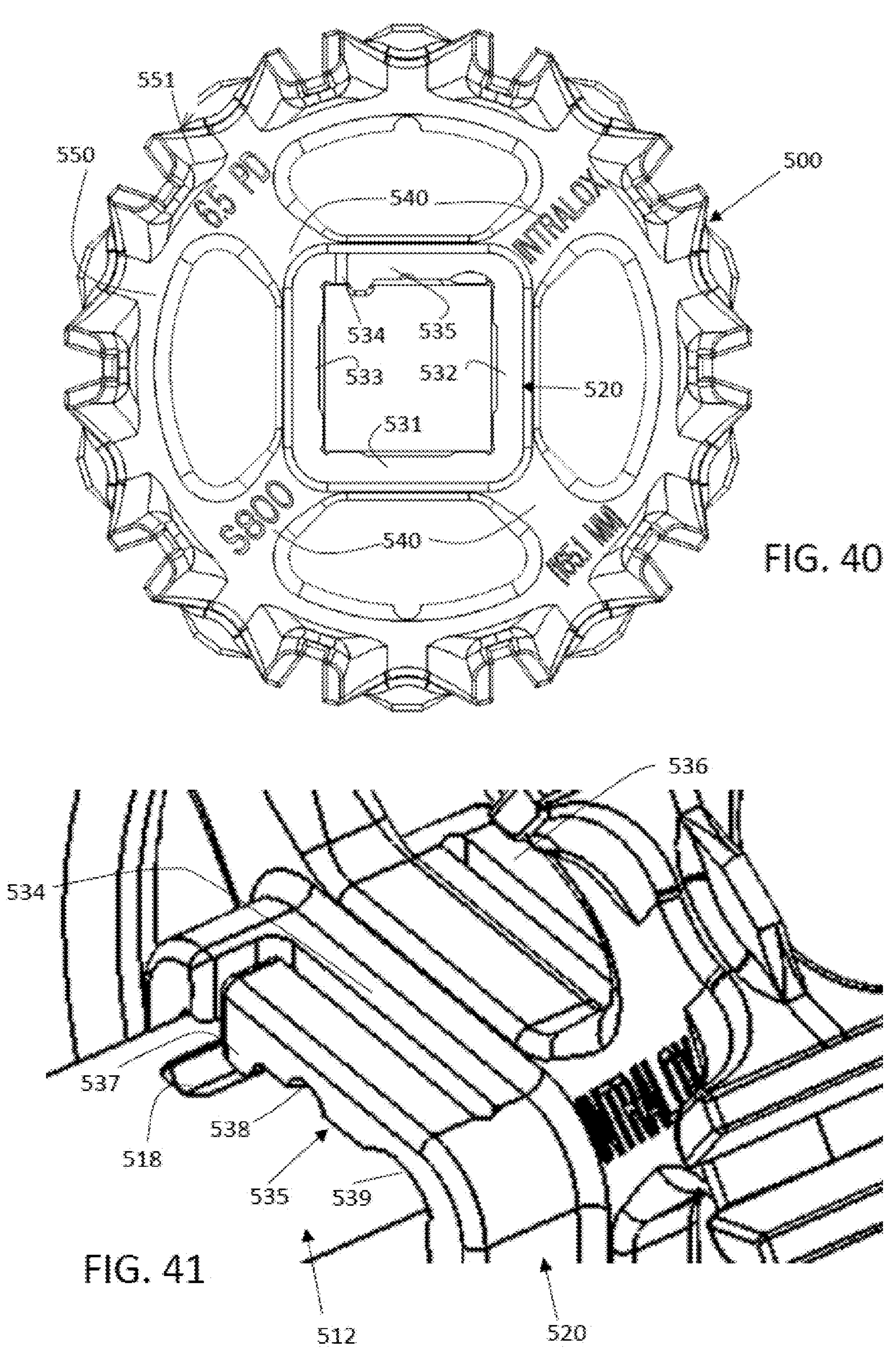
FIG. 40 is a front view of a sprocket including a flexible hub in a locked position according to an embodiment.
FIG. 41 is a detailed view of the flexible portion of the flexible hub of the sprocket of FIG. 40.
Figure 42:
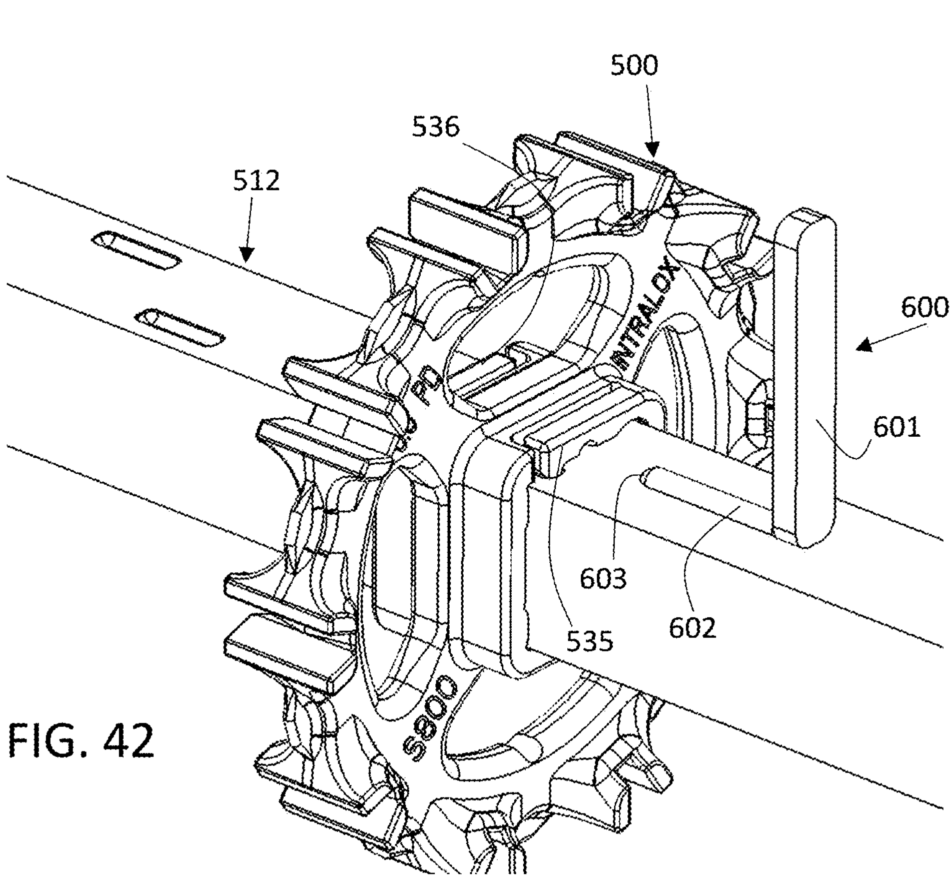
FIG. 42 is an isometric view of a sprocket with a flexible hub at the beginning of an unlocking of the sprocket using a tool.
Figure 43:
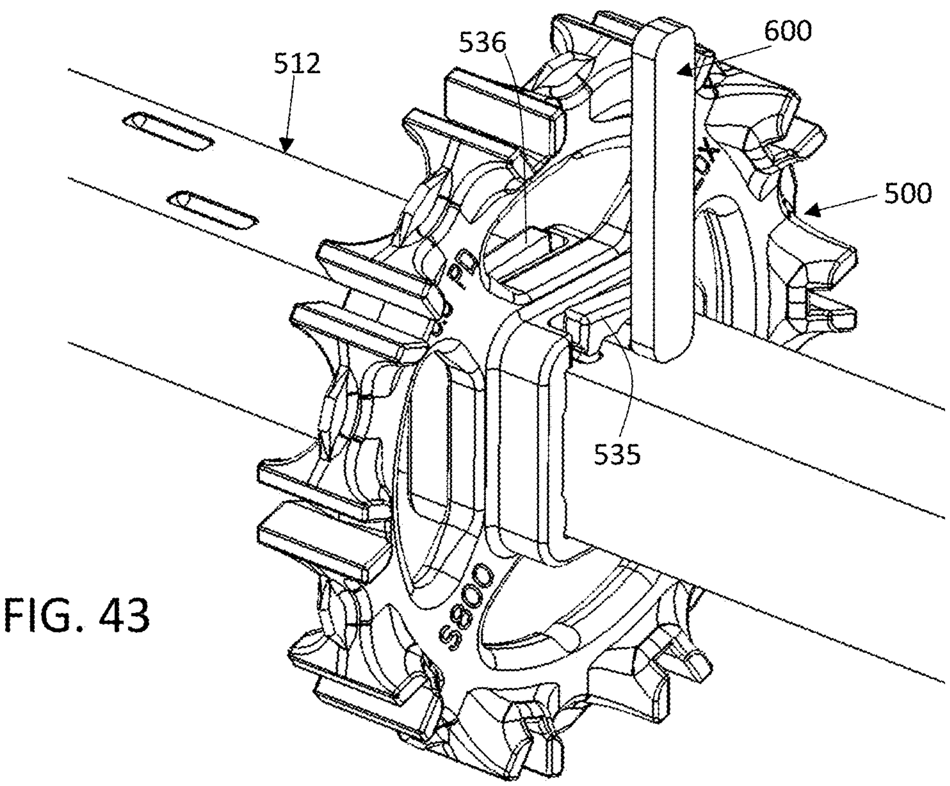
FIG. 43 is an isometric view of the sprocket of FIG. 42 during flexing of the flexible hub with a tool to unlock the sprocket from the shaft.
Figure 44:
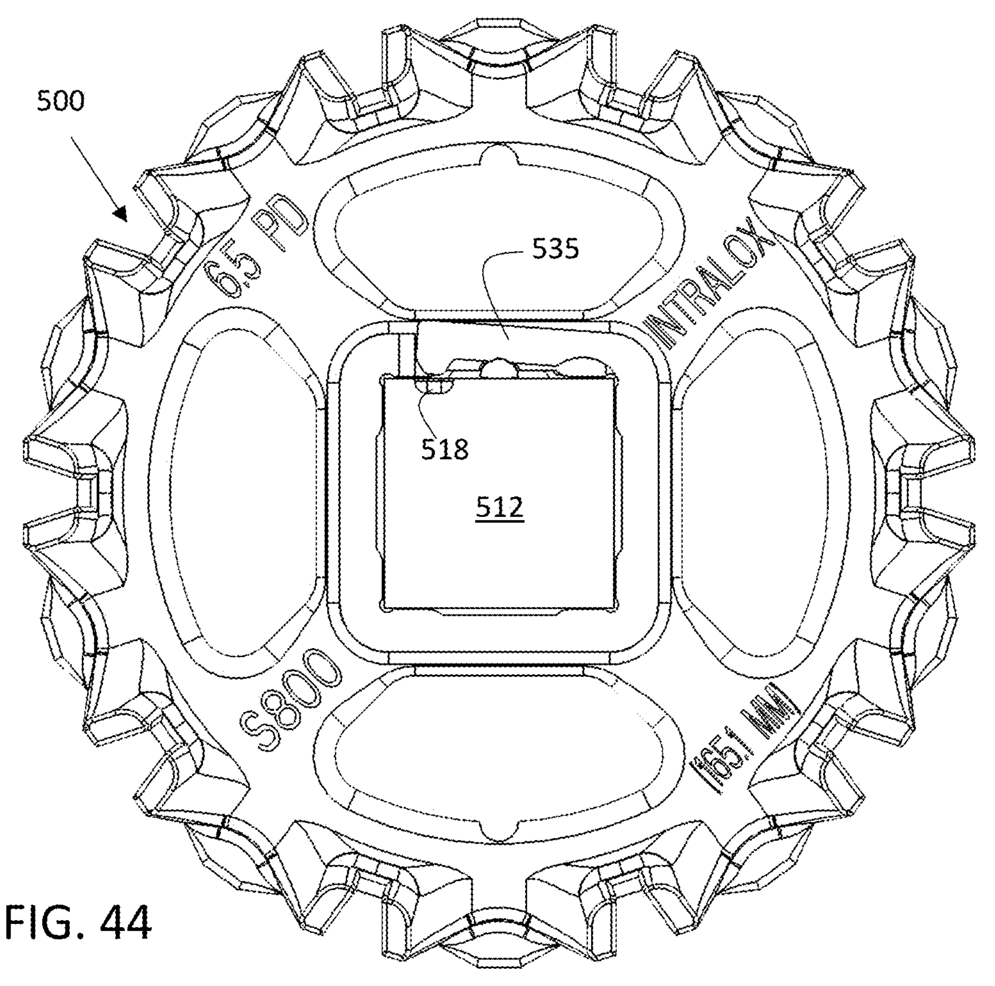
FIG. 44 is a front view of the sprocket of FIG. 42 during flexing of the flexible hub.
Figure 45:
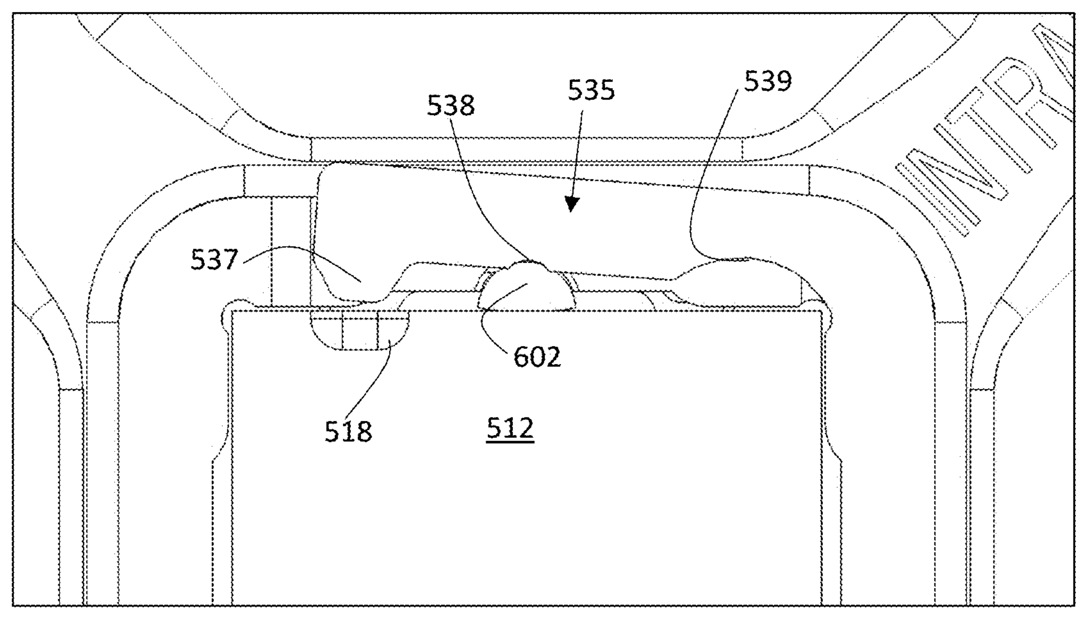
FIG. 45 is a detailed front view of the flexible portion of the flexible hub of FIG. 44 during flexing.
Figure 46:
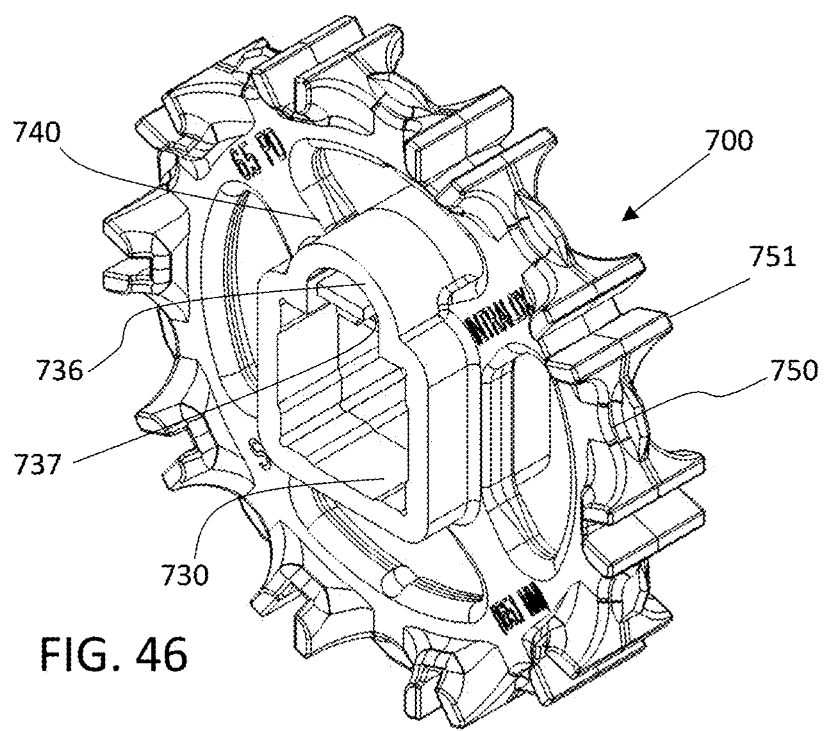
FIG. 46 is an isometric view of a sprocket with a flexible hub according to another embodiment.
Figure 47:
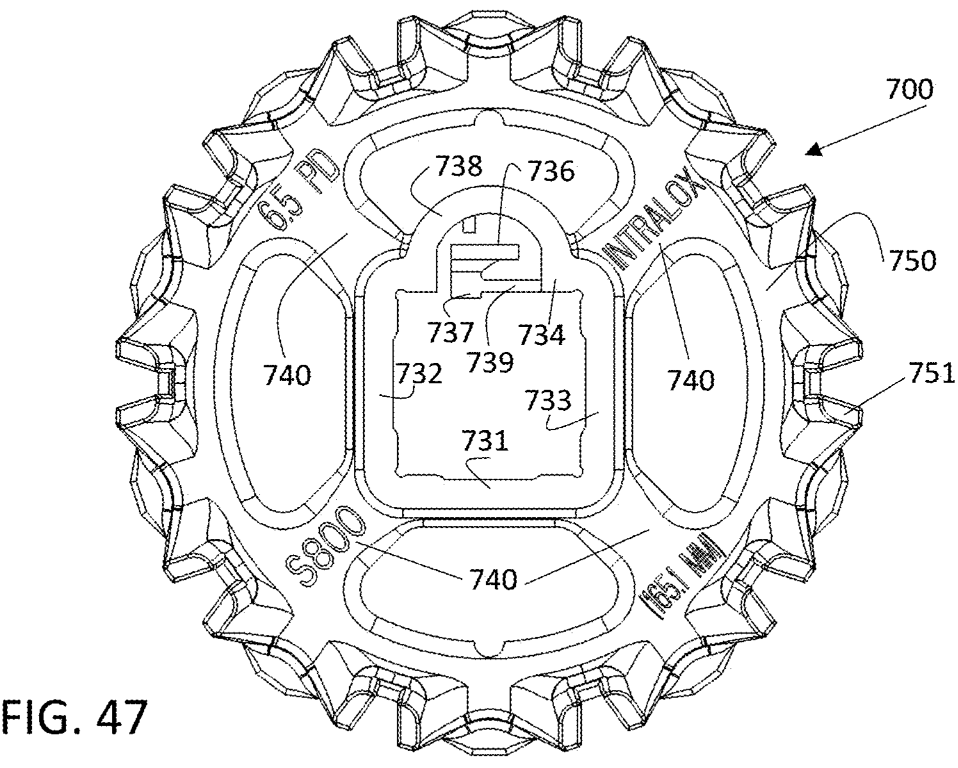
FIG. 47 is a front view of the sprocket of FIG. 46.

Referring to FIGS. 40 and 41, the illustrative flexible hub 520 of the sprocket 500 includes a plurality of shaft-engaging walls. The illustrative hub is configured to receive a square shaft 512 with four perpendicular faces and therefore includes four shaft-engaging walls 531, 532, 533, 534. The shaft-engaging walls transmit torque from the shaft to the peripheral teeth. The flexible hub 520 can be designed to engage any suitable size and shape shaft. Wall 534 forms a flexible portion for axially containing the sprocket on the shaft 512. The illustrative flexible wall 534 includes a pair of opposing flexible fingers on each axial end of the hub. A first flexible finger 535 extends laterally across a first axial end of the hub over a shaft face and a second flexible finger 536 extends laterally on a second axial end of the hub in an opposite direction from the first flexible finger 535 over the shaft face.

Each flexible finger 535, 536 is separated from a non-flexible portion of the wall 534 by side and tip gaps and connects to the non-flexible portion of the wall 534 at a base. Each flexible finger 535, 536 includes a radially inwards facing locking tab 537 at the tip end and a central lifting recess 538 in a central portion. The central lifting recesses 538 are aligned with each other. A flexing recess 539 at the base facilitates flexing of the flexible finger.

In a locked position, the walls 531, 532, 533, 534 engage the shaft. The flexible fingers naturally rest against a corresponding face of the shaft and the locking tabs 537 engage corresponding recesses 516 or 518 to lock the sprocket to the shaft. Recesses 516 lock the axial position of the sprocket, while recesses 518 restrain the axial position, allowing a limited amount of axial float of the sprocket along the shaft 512.

As shown in FIGS. 42-45, the flexible fingers 535, 536 can be selectively disengaged from the shaft using a tool 600 to release the sprocket 500 from the shaft. The tool 600 comprises a handle 601, a lifting member 602 extending perpendicular to the handle. The lifting member 602 terminates in a tapering tip 603. The lifting member 602 has a semicircular cross-section, with a flat bottom and rounded side and tops.

To release the sprocket 500 from the shaft 512, the tool 600 slides over the shaft 512, with the flat bottom of the lifting member 602 sliding over a corresponding face of the shaft 512. The lifting member 602 enters the lifting recesses 538 of both flexible fingers 535, 536 to lift the locking tabs 537 out of engagement with the shaft recess 516. Then the sprocket 500 can be repositioned or removed from the shaft by sliding the sprocket off of the shaft. Other suitable tools for disengaging the flexible member from the shaft can be used.

The illustrative sprocket may be an injection-molded, unitary structure, but the invention is not so limited.

FIGS. 9 and 10 illustrate another embodiment of a conveyor component, shown as a sprocket 700, with a flexible hub to facilitate mounting and adjustment of the component relative on a shaft 712. The sprocket 700 includes a shaft-receiving hub 730 with a flexible portion, spokes 740 radiating from the flexible hub and a closed periphery 750 with drive elements connected to the hub 730 via the spokes or another connector.

The illustrative shaft-receiving hub includes four shaft-engaging walls 731, 732, 733, 734. The shaft-engaging walls transmit torque from the shaft to the peripheral drive elements. Wall 734 includes a central flexible portion for axially containing the sprocket on the shaft 712. The central flexible portion includes an axially-extending flexible finger that can flex up and down. The flexible finger includes a flexible neck 739 extending from wall 734 and terminating in a locking tab 737 that radially inwards from the flexible finger end of the flexible neck. The flexible neck 739 connects the locking tab 737 to the non-flexible portion of the hub wall 734. The flexible finger forms a lifting tab 736 above the locking tab 737 at the tip of the finger. The lifting tab 736 may protrude axially outward of the locking tab 737 to facilitate access, but the invention is not so limited. A sheath 738 surrounds the flexible portion and provides clearance for vertical movement of the flexible finger.

Figure 48:
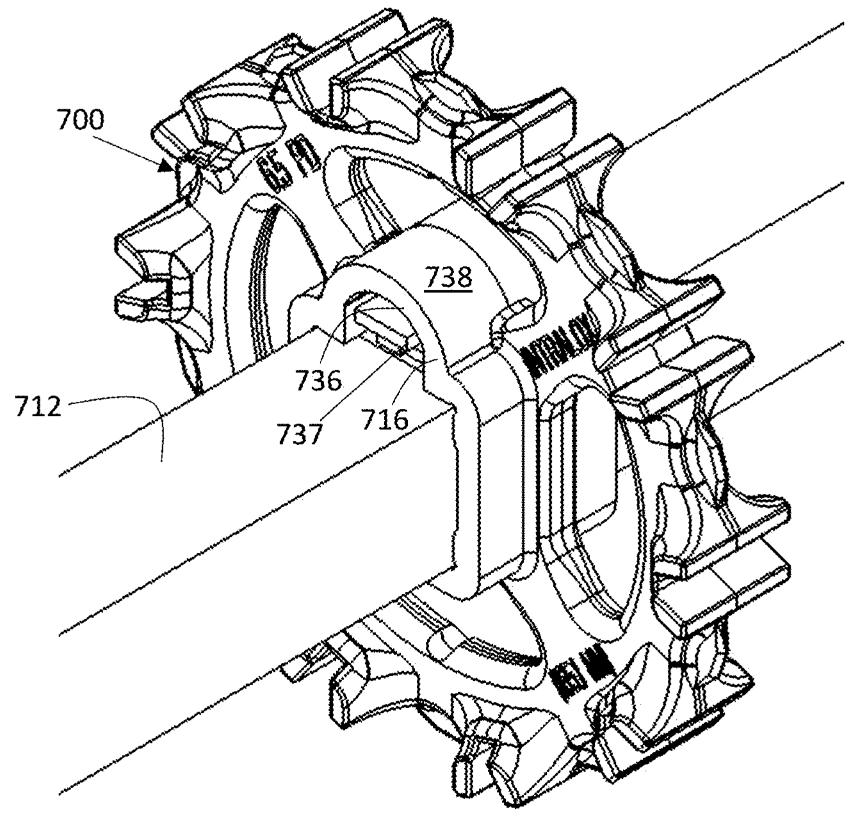
FIG. 48 is an isometric view of the sprocket of FIGS. 46 and 47 mounted on a shaft.

In a locked position, shown in FIG. 48, the locking tab 737 is received in a groove 716 on the shaft. The sprocket 700 naturally assumes the locked position. The groove 716 is sized and dimensioned to allow axial float or limit axial movement of the sprocket. The groove 716 can extend along the entire width of the shaft 712 or be a single, smaller centered pocket.

Figure 49:
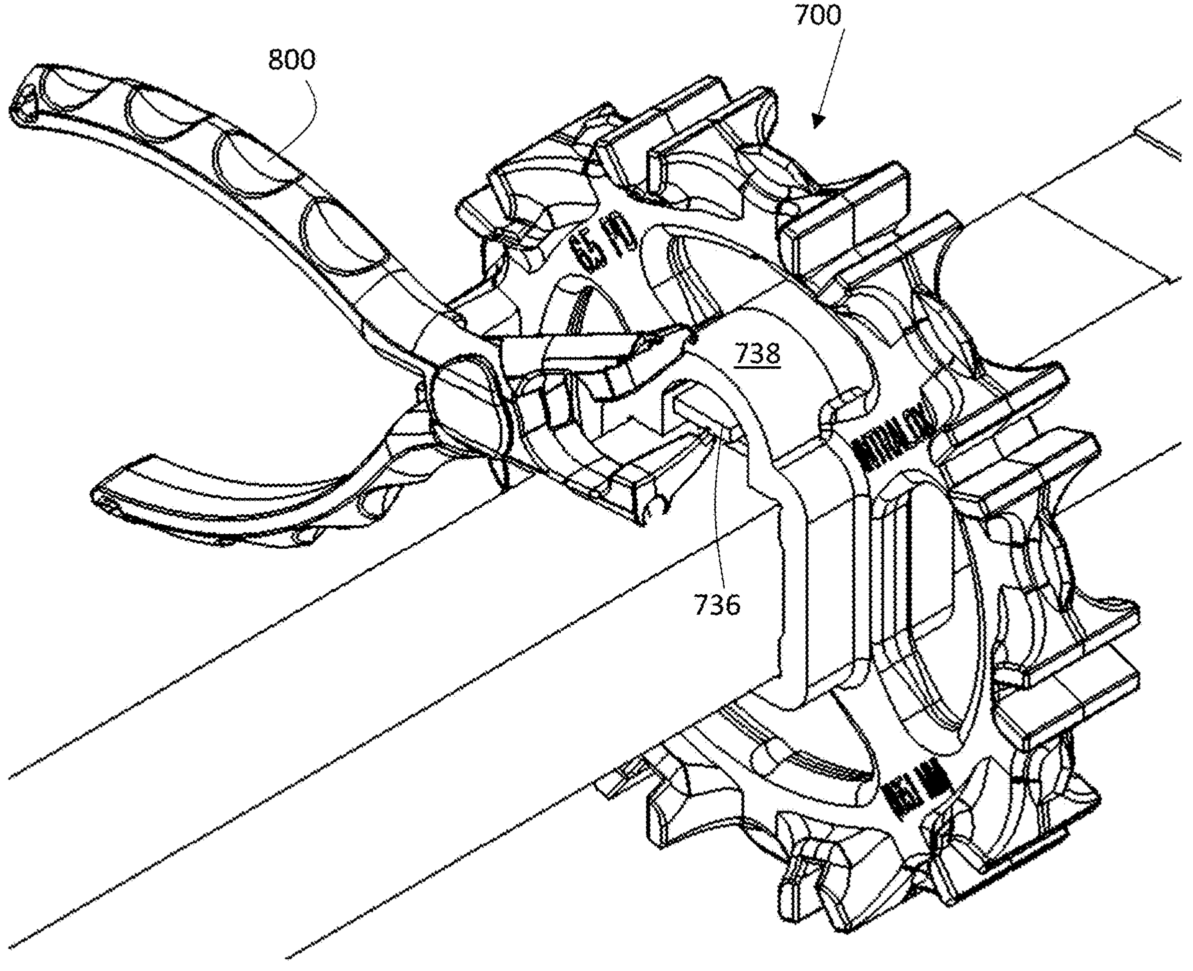
FIG. 49 shows the assembly of FIG. 48 during unlocking of the sprocket using a tool.
Figures 52, 53:
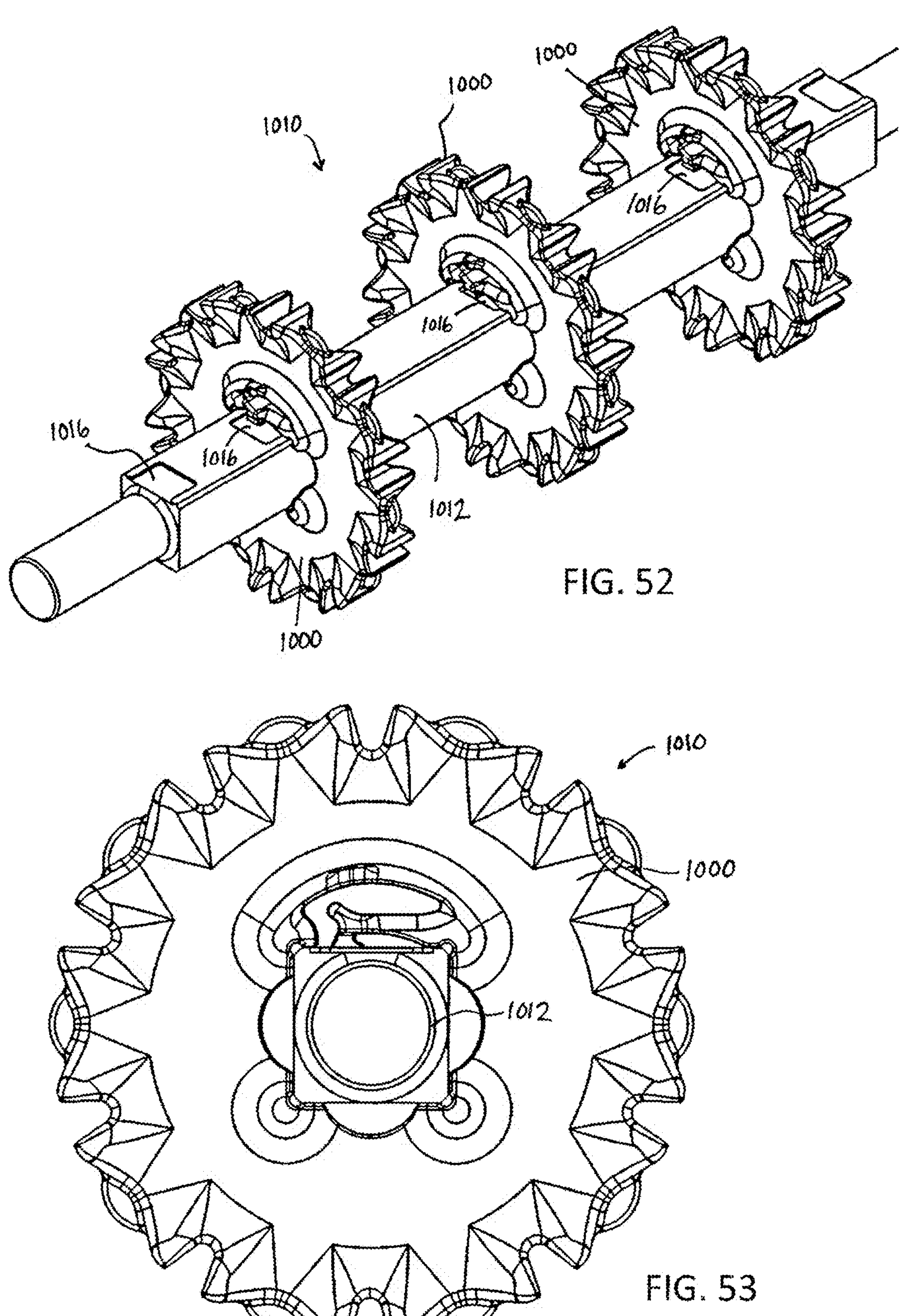
FIG. 52 is an isometric view of a sprocket assembly including sprockets with flexible hubs according to another embodiment.
FIG. 53 is a front view of the assembly of FIG. 52.

Referring to FIG. 49, a tool, shown as a pliers tool 800, may be used to release the sprocket from the locked position. The flexible finger may be raised by squeezing the lifting tab 736 and sheath 738 with the pliers, lifting the locking tab 737 out of the groove. Then, the sprocket 700 can easily slide along the length of the shaft for removal or repositioning. The lifting tab 736 may also be lifted manually or using another type of tool.

Referring to FIGS. 50A and 50B, the flexible finger can be a single member comprising the neck 739, locking tab 737 and lifting tab 736 extending through the hub and symmetrical about the axial center of the sprocket 700. Alternatively, the flexible portion of the hub 730 can comprise multiple axially-extending flexible fingers and—or locking tabs 737.

In another embodiment, shown in FIGS. 51A and 51B, a flexible shaft-receiving hub 930 of a conveyor component, such as a sprocket or roller, can include a flexible finger 936 with a locking tab 937 in which the flexible finger is attached to the top wall of a sheath 938 by a neck 939. In the embodiment of FIGS. 51A and 51B, the flexible finger 936 extends axially along the shaft, with the locking tab 937 in the axial center of the hub 930. The flexible finger 936 can be raised to release the locking tab 937 from engagement with a groove or other feature of a shaft.

Figure 54:
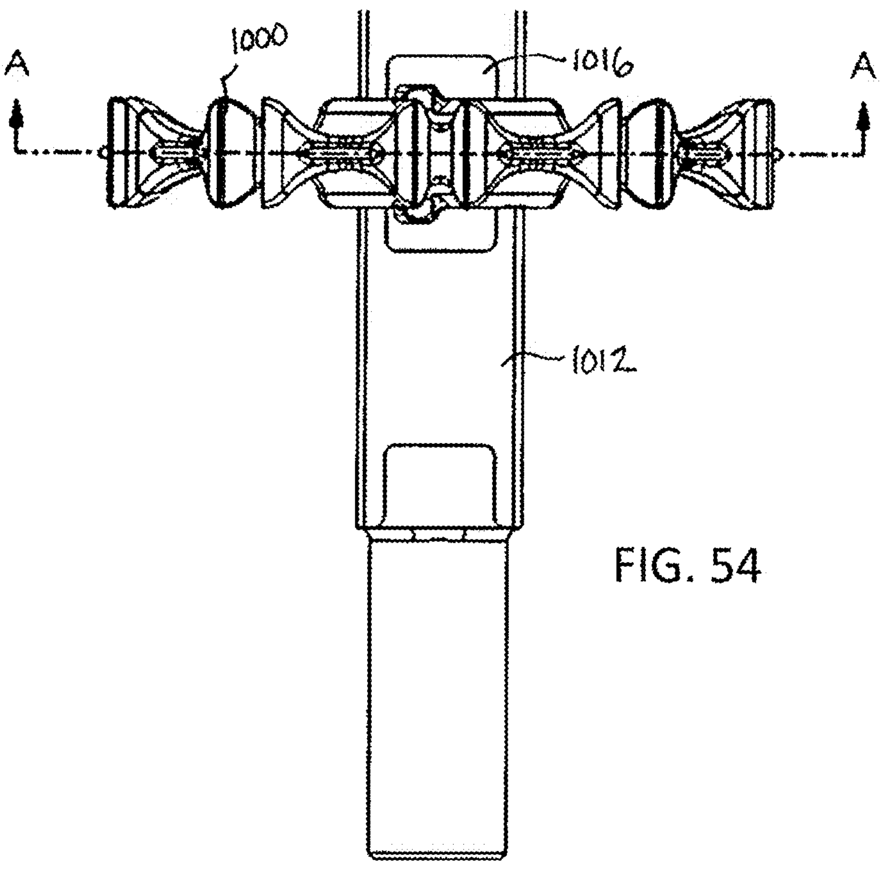
FIG. 54 is a top view of a portion of the assembly of FIG. 52.

FIGS. 52-55 show another embodiment of a sprocket assembly 1010 including a plurality of sprockets 1000 with flexible hubs mounted on a shaft 1012. The shaft has a series of surface recesses 1016 for receiving a locking tab of a flexible hub of a sprocket 1000. As shown, in FIG. 52, a plurality of sprockets 1000 can be arranged along the axial length of the shaft 1012, each in a mounting region defined by a recess 1016. Each illustrative recess 1016 is longer than the depth of a sprocket from a first face to a second face along the axial direction of the shaft and spans the majority of the face of the shaft, as shown in FIG. 54, but the invention is not so limited.

Figure 55:
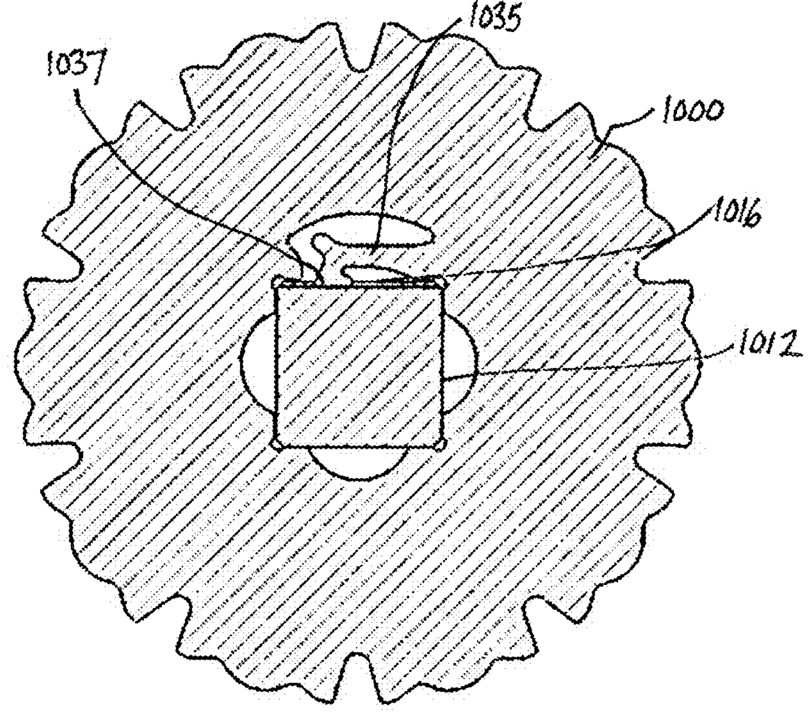
FIG. 55 is a cross-sectional view of the assembly of FIG. 54 through lines C-C.
Figure 56:
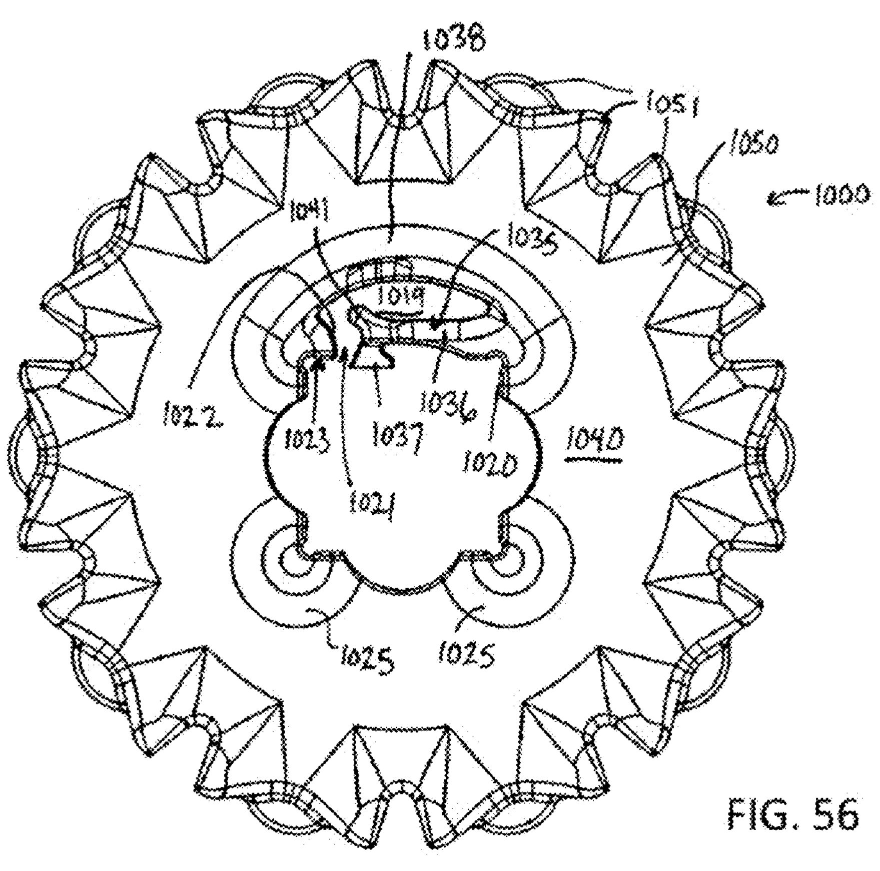
FIG. 56 is a front view of a sprocket of the assembly of FIG. 52.
Figure 57:
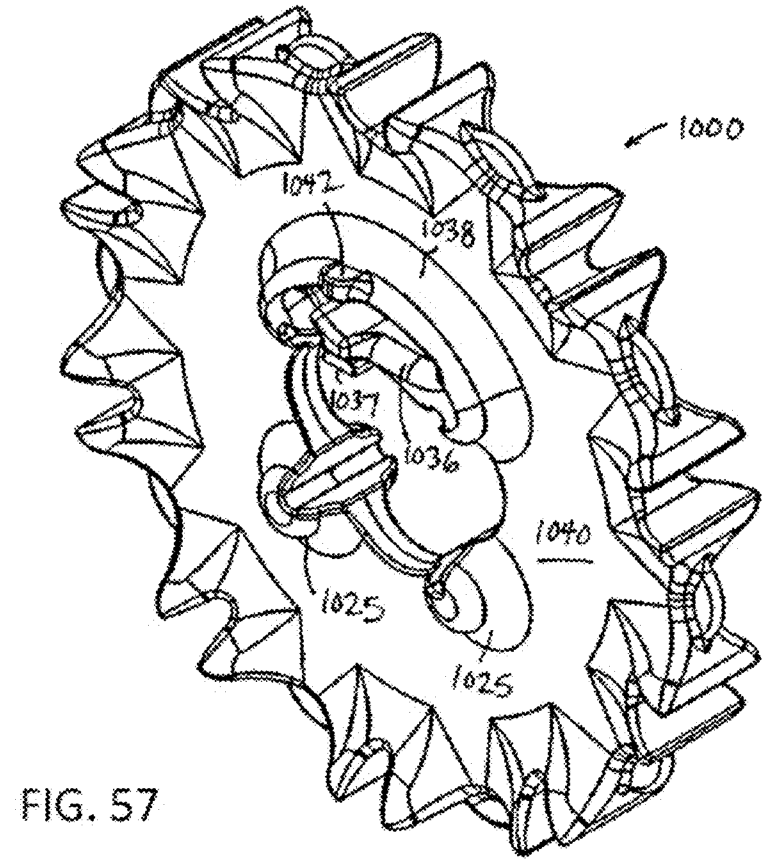
FIG. 57 is an isometric view of the sprocket of FIG. 56.
Figures 58, 59:
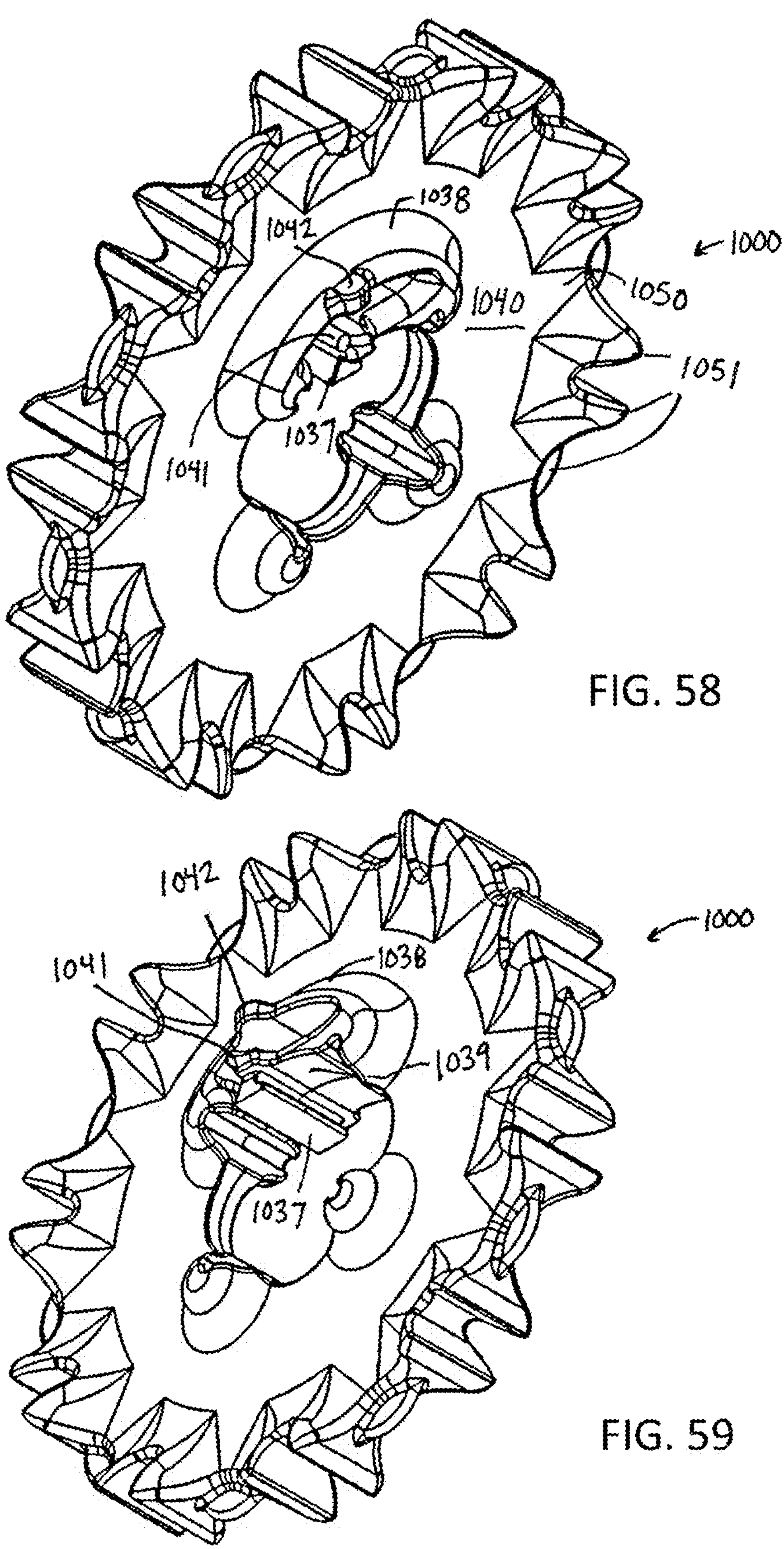
FIG. 58 is another view of the sprocket of FIG. 56.
FIG. 59 is a bottom isometric view of the sprocket of FIG. 56.

Each flexible hub includes non-flexing, shaft-engaging portions and a flexible finger 1035 forming a shaped locking tab 1037 that overlies a surface of the recess 1016 in a latched position, as shown in FIG. 55. The shaped locking tab 1037 has a flat bottom surface, as described below, to overlie against the recess 1016.

Referring to FIGS. 56-59, each sprocket 1000 includes a hub 1020 forming an axially-extending opening for seating the shaft 1012, a peripheral portion 1050, which may include drive elements 1051, and a connecting portion 1040 between the flexible hub 1020 and peripheral portion 1050. The illustrative connecting portion 1040 is solid, but can comprise spokes or another suitable structure. The flexible hub 1020 includes three fixed walls for containing three sides of the shaft 1012 and a fourth wall formed by a flexible finger 1035 extending laterally from a corner region. The shaft-containing walls may include cleaning recesses and reliefs in corners. The flexible finger 1035 includes a shaped body 1036 extending from a fixed portion and terminating in a shaped locking tab 1037 extending toward the center of the hub 1020. A shaped lifting handle 1041 extend away from the shaped locking tab 1037. A relief area 1019 is formed above the flexible finger 1035 to allow the flexible finger to flex up and down. The flexible hub 1020 forms a space 1021 between the lifting handle 1041 and wall 1022 extending away from a shaft-engaging wall 1023. The walls 1022 and 1023 may be fixed. The bottom surface 1039 of the flexible finger 1035 curves concavely towards the base of the locking tab 1037.

The sprocket 1000 further includes a shaped sheath 1038 surrounding the top corners of the flexible hub 1020 and flexible finger 1035 to strengthen the sprocket in that area and provide clearance for the flexible finger 1035. The sprocket 1000 also includes shaped mounds 1025 around the bottom two corners of the flexible hub 1020 to strengthen the sprocket. The shaped sheath 1038 and mounds 1025 protrude past of the faces of the connecting portion 1040 to thicken the sprocket in the hub region.

A grasping ledge 1042 is formed in the sheath 1038 above the shaped lifting handle 1041 and protrudes outward from the sheath 1038.

Figure 60:
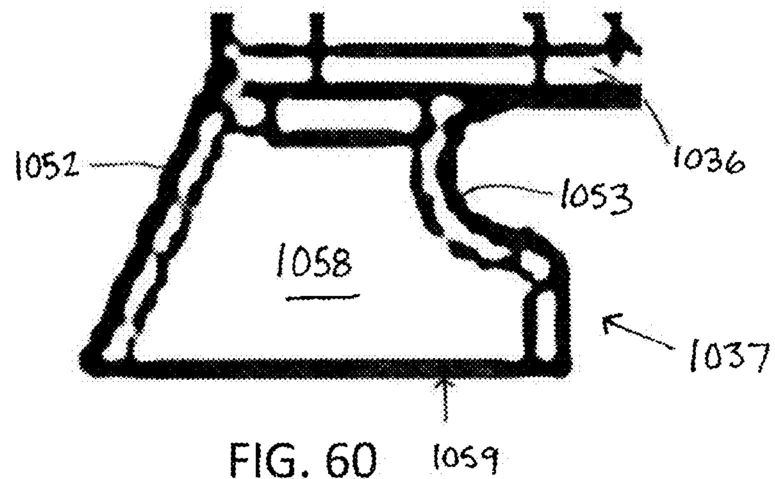
FIG. 60 is a detailed front view of a locking tab of the sprocket of FIG. 56.
Figure 61:
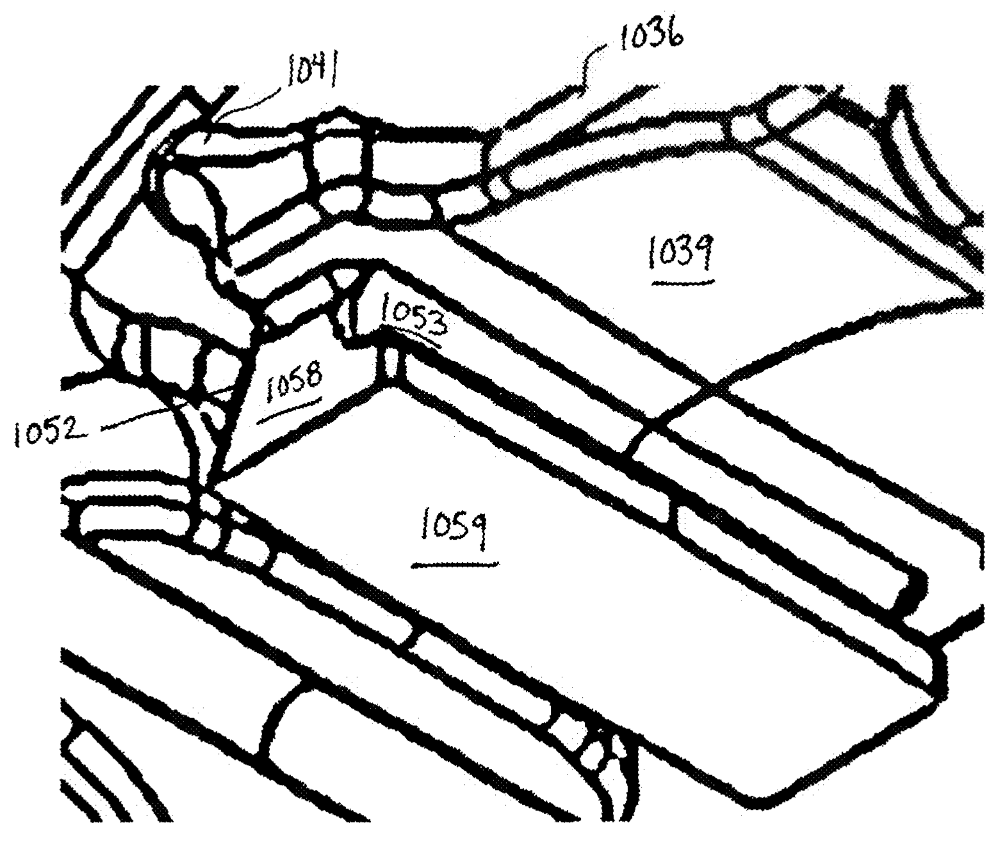
FIG. 61 is a bottom isometric view of the locking tab of FIG. 60.

As shown in FIGS. 60 and 61, the illustrative shaped locking tab 1037 flares from the tip of the shaped body 1036 to form a flat, rectangular-shaped bottom surface 1059 that extends through the axial width of the hub. The shaped locking tab 1037 includes flat front and rear surfaces 1058, a first angled side wall 1052 extending at an angled from the end of the shaped body 1036 and a second curving side wall 1053 that flares from the shaped body 1036. The shaped lifting handle 1041 extends forward of the front surface 1058, projecting outwards. The grasping ledge 1042 also protrudes from the sheath 1038, so as to align with the shaped lifting handle 1041.

Figures 62, 63:
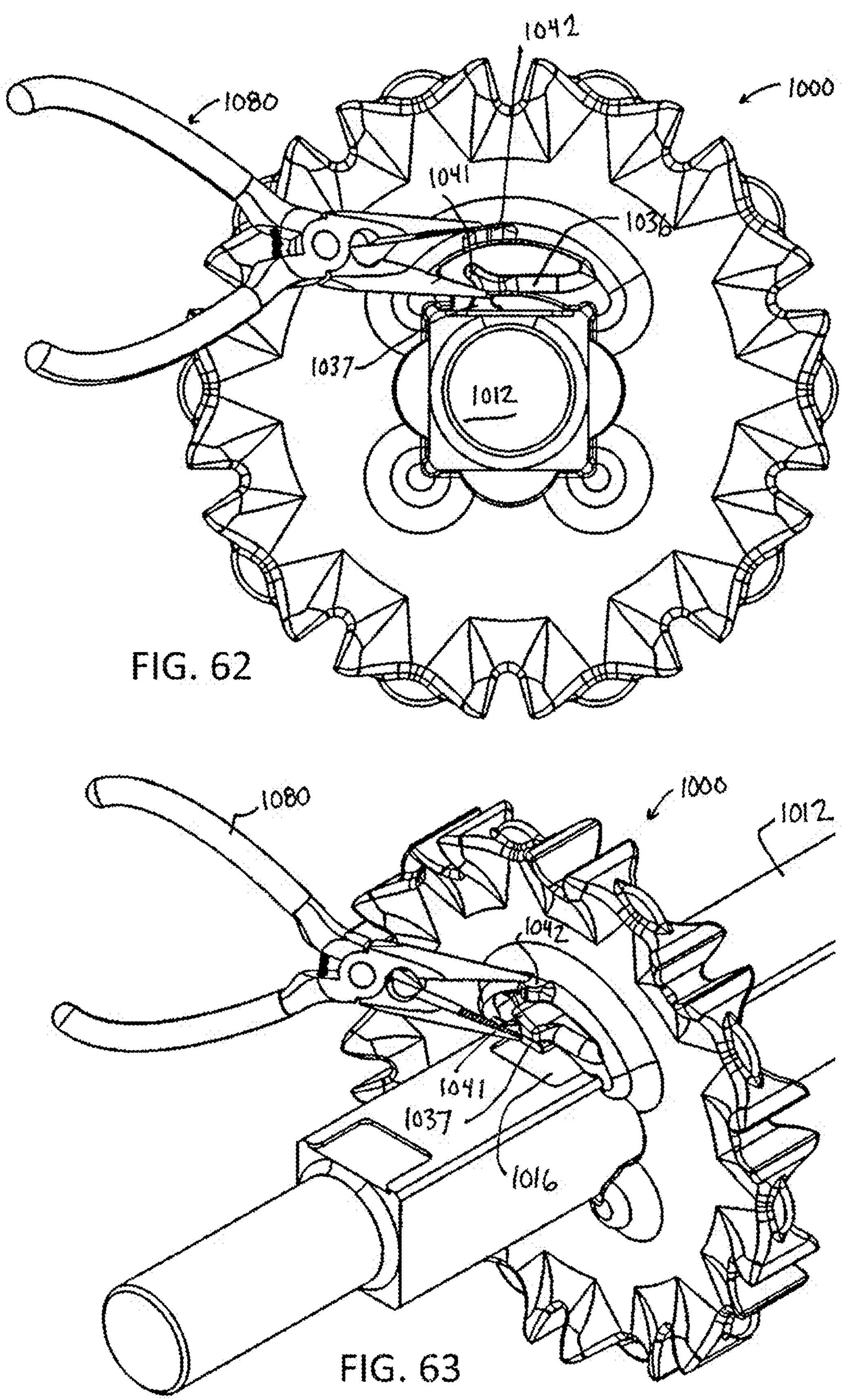
FIG. 62 is a front view of the sprocket of FIG. 19 during unlatching using a pair of pliers.
FIG. 63 is an isometric top view of the sprocket of FIG. 62.

Referring to FIGS. 62 and 63, a tool, shown as a pair of pliers 1080 may be used to release the locking tab 1037 from engagement with the recess 1016 of a shaft 1012 received in the flexible hub 1020. The locking tab 1037 may be lifted by squeezing the lifting handle 1041 and grasping ledge 1042 together between the jaws of the pliers 1080. With the locking tab 1037 disengaged, the sprocket 1000 can slide along the shaft 1012 for repositioning or removal.

Figure 64:
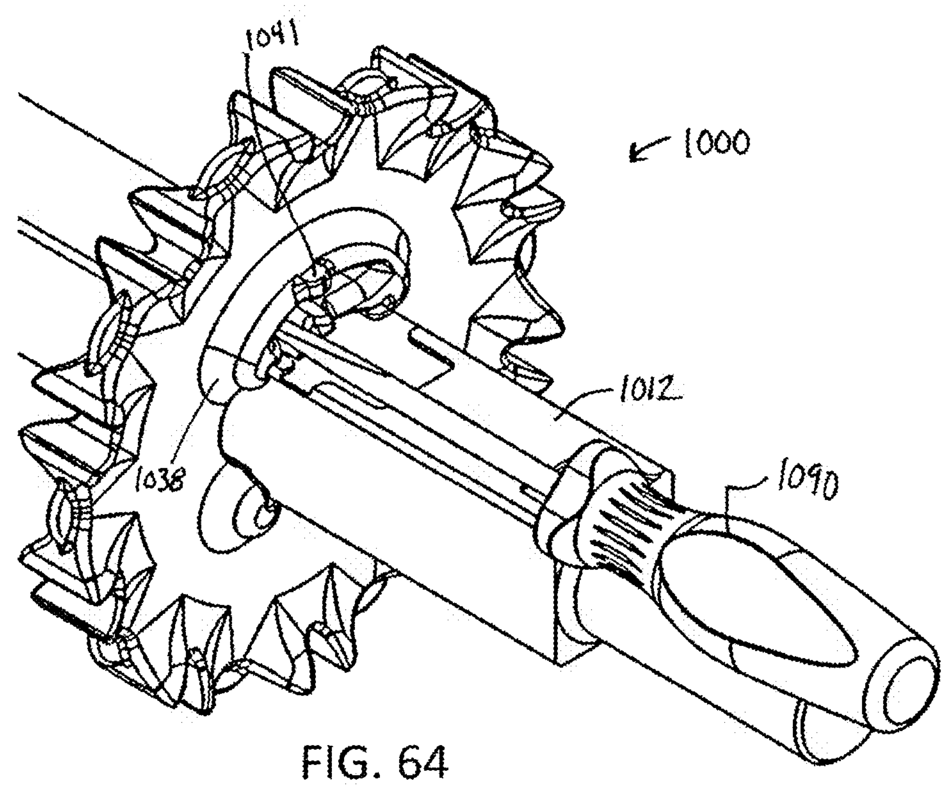
FIG. 64 is an isometric top view of the sprocket of FIG. 56 during unlatching using a screwdriver.
Figure 65:
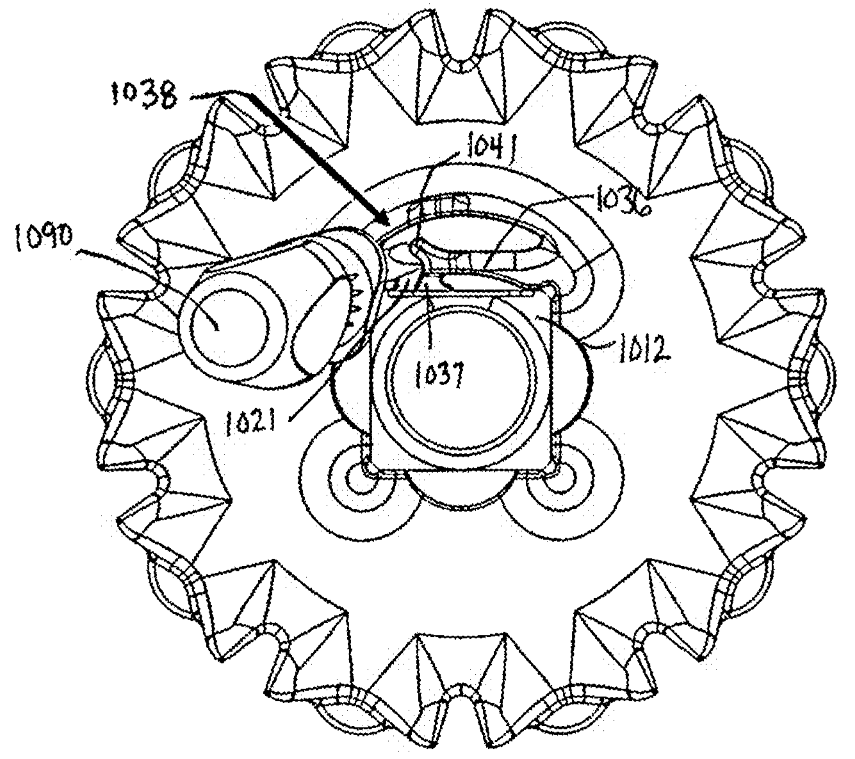
FIG. 65 is a front view of the sprocket of FIG. 64.
Figures 66, 67:
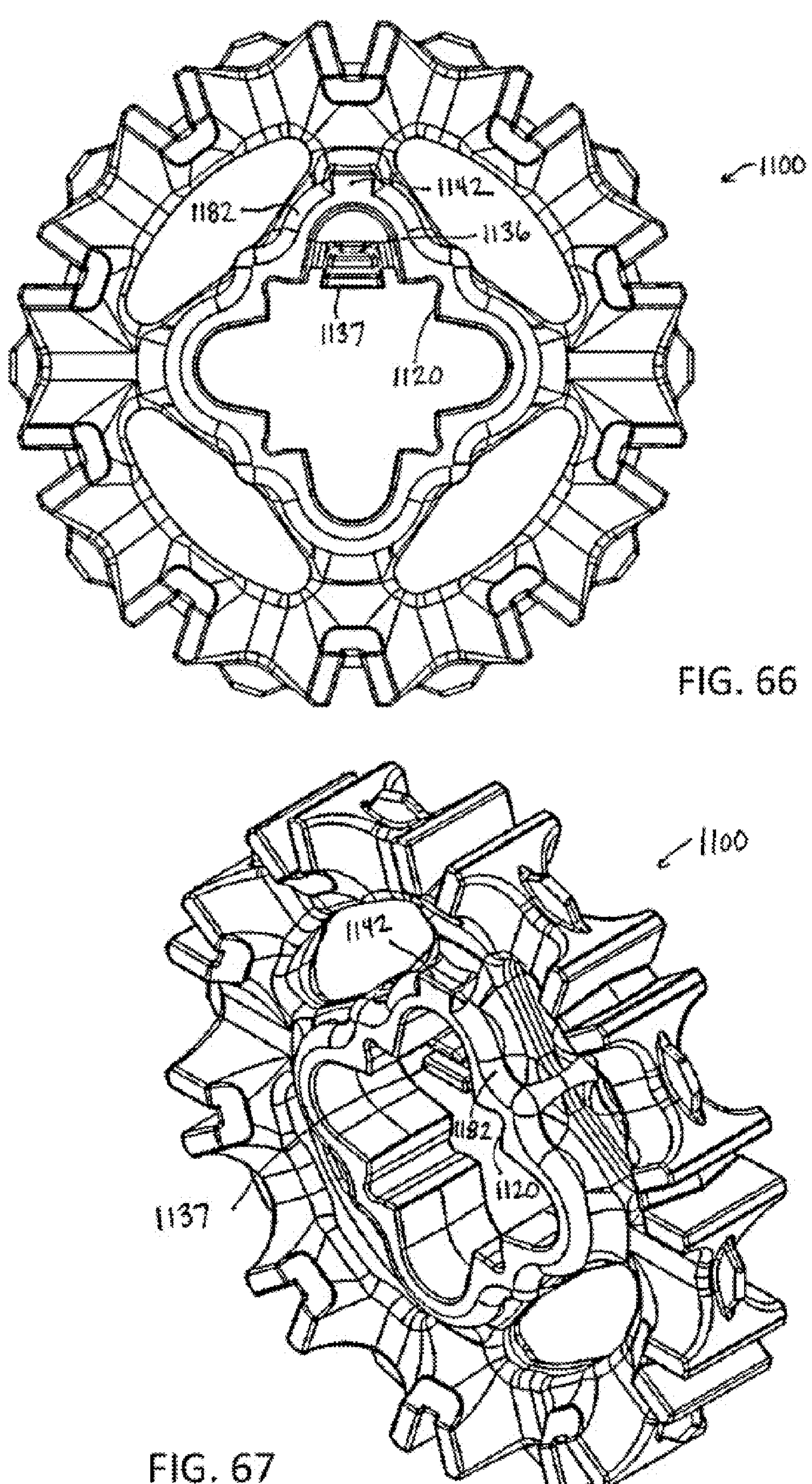
FIG. 66 is a front view of a sprocket with a flexible hub portion according to another embodiment.
FIG. 67 is an isometric top view of the sprocket of FIG. 66.
Figure 68:
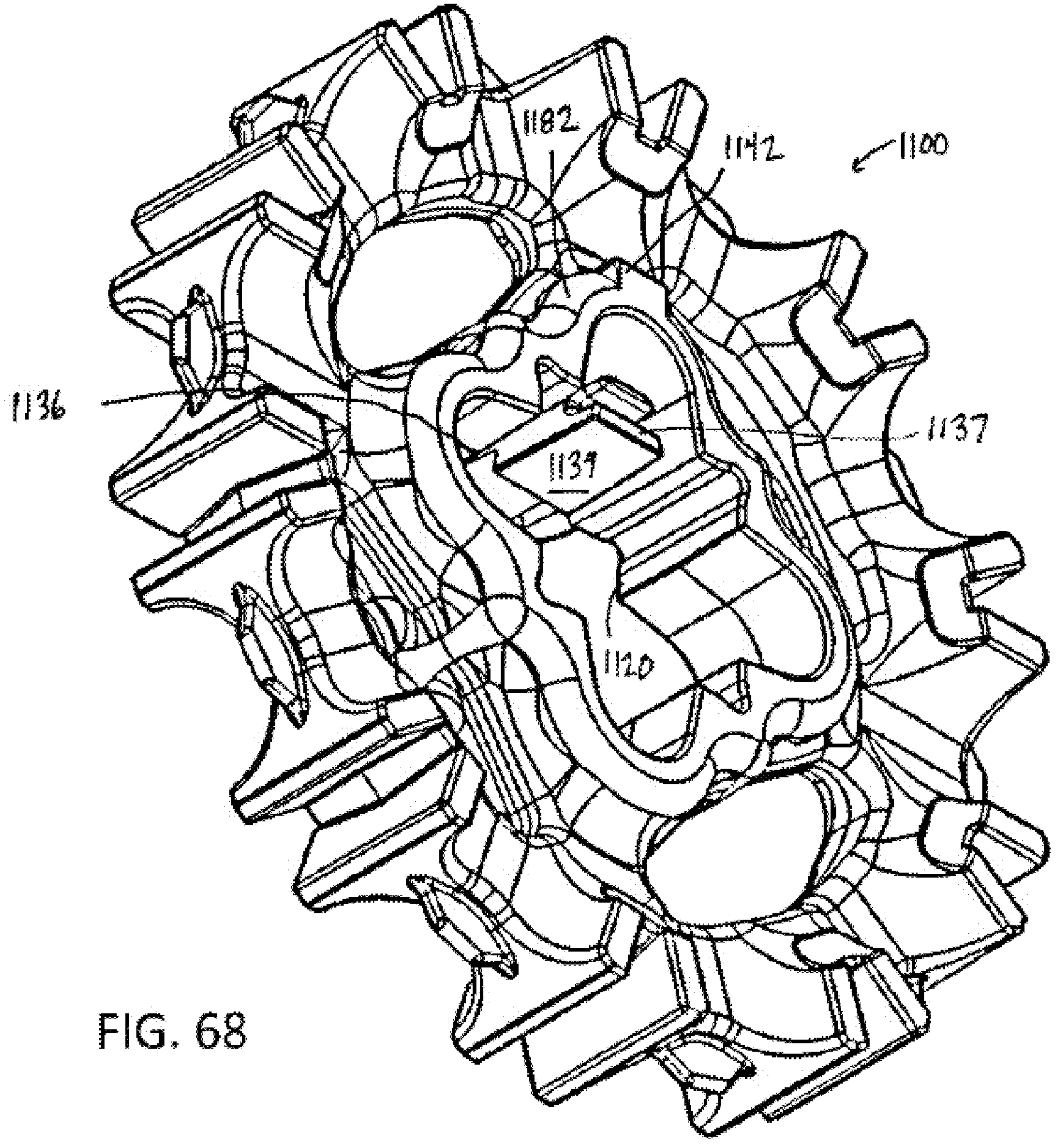
FIG. 68 is an isometric bottom view of the sprocket of FIG. 66.
Figure 69:
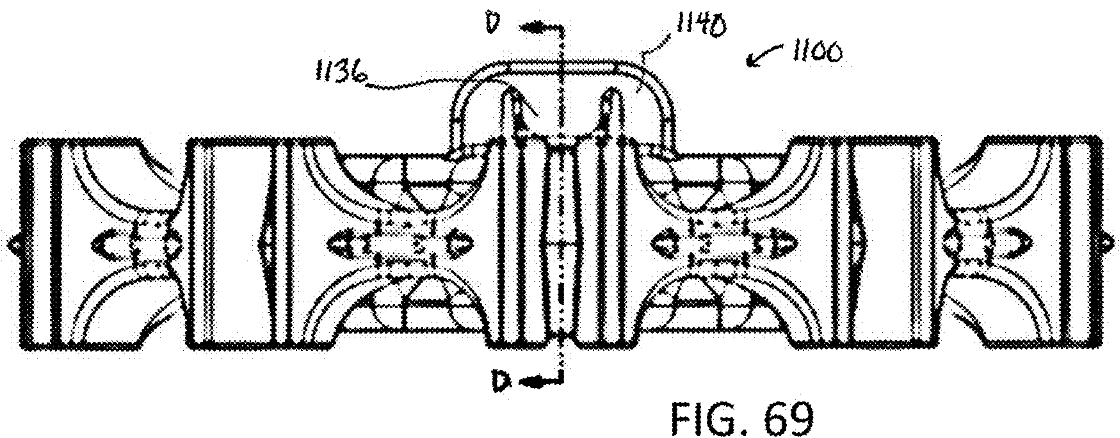
FIG. 69 is a top view of the sprocket of FIG. 66.

Any suitable tool may be used to disengage the locking tab 1037. For example, in another embodiment, shown in FIGS. 64 and 65, a screwdriver 1090 may be used to lift the locking tab 1037 with a prying action. The tip of the shaft of the screwdriver 1090 may be inserted into the space 1021 between the lifting handle 1041 and wall 1022 and rotated or otherwise manipulated to push up on the lifting handle 1041 to disengage the locking tab 1037 from the shaft 1012.

Figure 70:
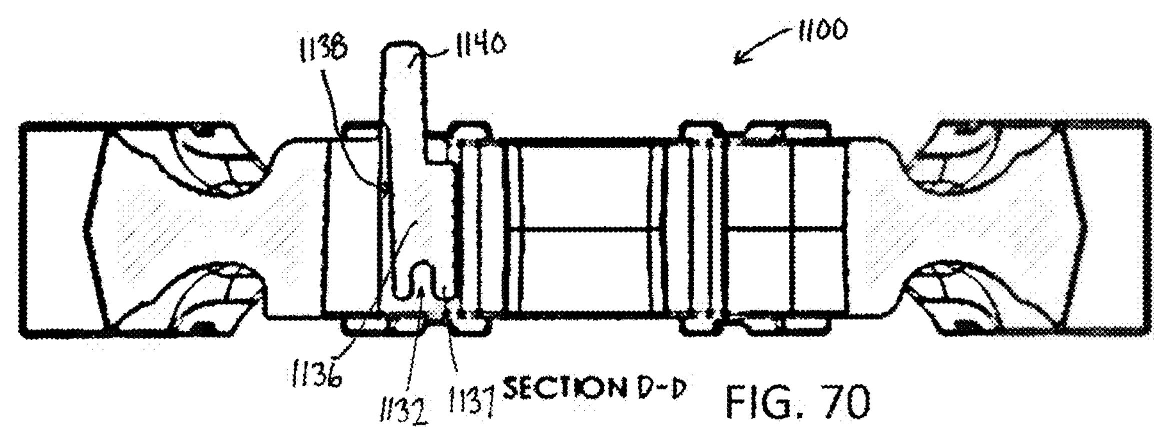
FIG. 70 is a cross-sectional view through line D-D of the sprocket of FIG. 69.
Figure 71:
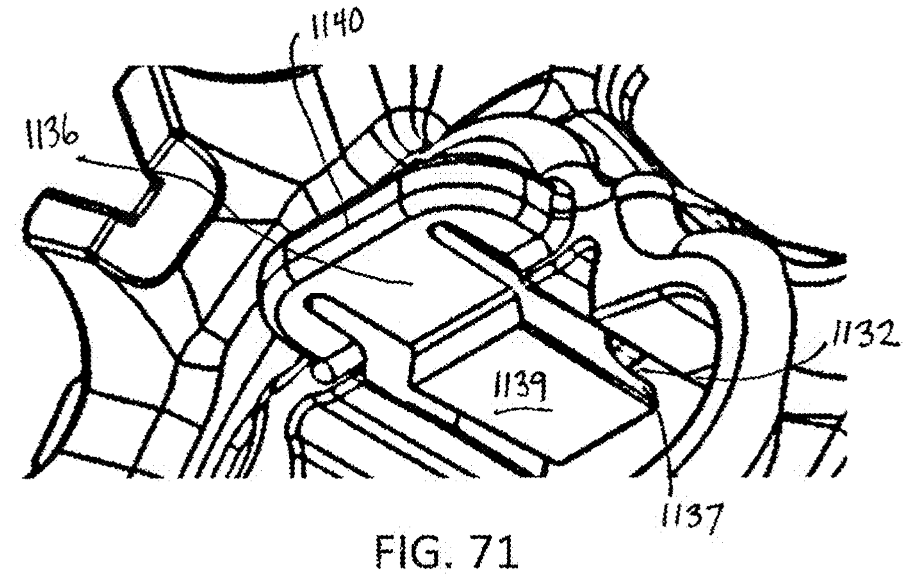
FIG. 71 is a detailed view of a locking tab of the sprocket of FIG. 66.

FIGS. 66-71 show another embodiment of a sprocket including a flexible finger to facilitate mounting and dismounting of the sprocket on a shaft. The sprocket 1100 includes an axially-extending flexible finger 1136 including a locking tab 1137 extending radially inwards. The illustrative locking tab 1137 has a flat bottom surface 1139, which may be rectangular in shape, as shown in FIG. 71, but the invention is not so limited.

The flexible finger 1136 extends from a base 1140 over a side of a hub 1120 forming an opening for seating a shaft. The base 1140 extends outwards from a first face of the sprocket, but the invention is not so limited. A lateral channel 1132 in the tip of the flexible finger 1136 forms a lifting tab above the locking tab 1137. In one embodiment, the top surface 1138 of the flexible finger angles inwards toward the center of the sprocket as it extends from the base 1140, as shown in FIG. 70. As also shown in FIG. 70, the tip of the finger 1136 may be recessed from the second face of the sprocket, so that the locking tab 1137 and lifting tab are contained within the body of the sprocket.

The sprocket 1100 may also include a grasping ledge 1142 formed in a sheath portion 1182 above the locking tab 1137 and lifting tab to facilitate use of a gripping tool to lift the locking tab 1137 out of engagement with a feature, such as a recess or groove, on a shaft received in the hub 1120.

Figures 72, 73, 74:
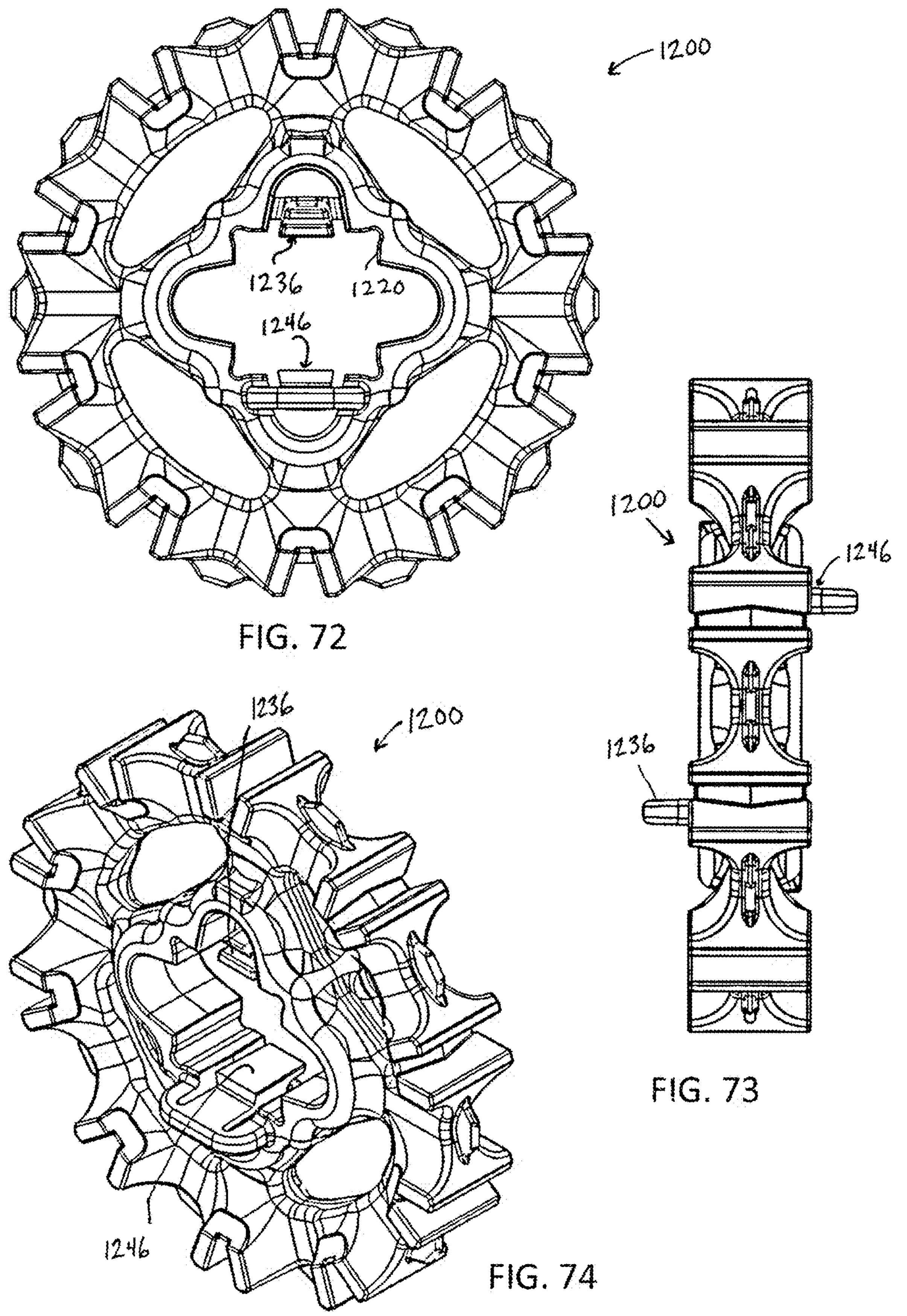
FIG. 72 is a front view of a sprocket with a flexible hub according to another embodiment.
FIG. 73 is a side view of the sprocket of FIG. 72.
FIG. 74 is an isometric view of the sprocket of FIG. 72.

In another embodiment, shown in FIGS. 72-74, a sprocket 1200 may include opposing flexible fingers to latch the sprocket 1200 to a shaft. Each flexible finger 1236, 1246 is similar in structure to the flexible finger 1136 of FIGS. 66-71. The first flexible finger 1236 is formed at a first side of a shaft-receiving hub 1220 and extends in a first axial direction. The second flexible finger 1246 is formed at a second side of the hub 1220 opposite the first side and extends in a second, opposite direction. A shaft configured to be received in the hub can have recesses configured to engage the flexible fingers, as described above.

Figure 75:
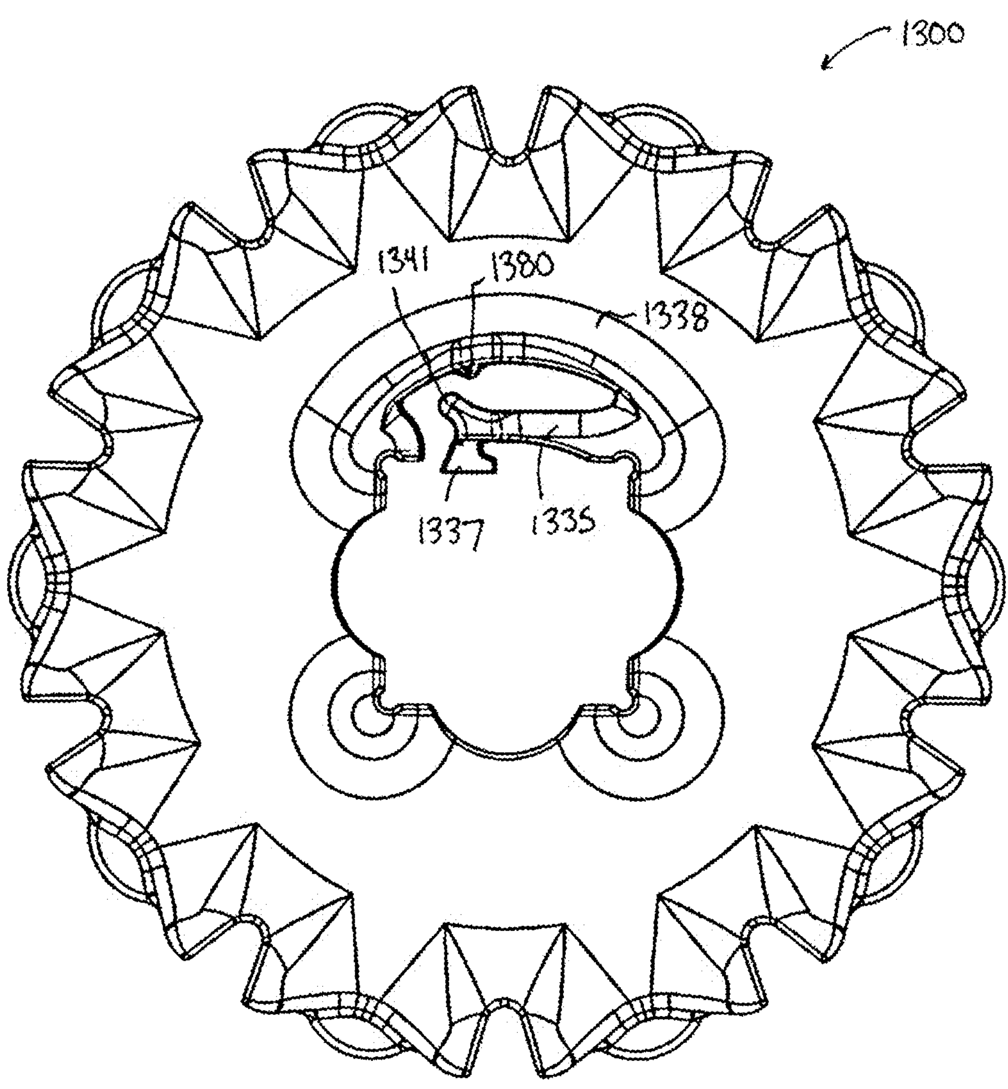
FIG. 75 is a front view of a sprocket with a flexible hub according to another embodiment.

Referring to FIG. 75, in another embodiment, a sprocket 1300 including a flexible retaining finger 1335 with a shaped locking tab 1337 and shaped lifting handle 1341 may further include a stopping projection 1380 in a shaped sheath portion 1338 to prevent overflexing of the flexible retaining finger 1335.

The invention is not limited to the illustrative conveyor roller, sprocket and—or mounting shaft, and encompasses variations and alterations of these embodiments. For example, the illustrative flexible hubs may be implemented in any shaft-mounted conveyor component, not limited to rollers and sprockets.

What is claimed is:

1. A component for a conveyor, comprising:
- a flexible hub for receiving a shaft, the flexible hub including a flexible finger with a locking tab for engaging a recess on the shaft and a sheath surrounding the flexible finger, the sheath providing clearance to allow vertical movement of the flexible finger; and
- a rim connected to the flexible hub, the rim having a continuous periphery for contacting a conveyor belt.

2. The component of claim 1, wherein the flexible hub includes a pair of opposing flexible fingers on each axial end of the flexible hub, each flexible finger extending laterally extending across a face of the shaft.

3. The component of claim 1, wherein the flexible finger includes a lifting recess for receiving a lifting tool in a middle portion of the flexible finger.

4. The component of claim 1, wherein the flexible finger includes a flexing recess at a base portion connecting the flexible finger to non-flexible portions of the flexible hub.

5. The component of claim 1, wherein the locking tab is formed at a tip of the flexible finger.

6. The component of claim 1, wherein the flexible finger extends axially within the flexible hub.

7. The component of claim 1, further comprising a stopping protrusion extending from the sheath to limit overflexing of the flexible finger.

8. The component of claim 1, further comprising a lifting handle extending away from the locking tab at the tip of the flexible finger.

9. The component of claim 8, further comprising a grasping ledge spaced from the lifting handle for engaging a tool.

10. The component of claim 1, wherein the flexible finger extends axially from a base that protrudes from a face of the component.

11. The component of claim 1, wherein the locking tab flares from a tip of the flexible finger.

12. The component of claim 11, wherein the locking tab includes a flat, rectangular-shaped bottom surface, flat front and rear surfaces, a first angled side wall extending at an angled from the tip of the flexible finger and a second curving side wall that flares from the flexible finger.

13. A conveyor assembly comprising:
- an axially-extending shaft, the shaft including a peripheral recess in a first face; and
- a component mounted to the shaft, the component including a hub for receiving a shaft, the hub including a flexible finger with a locking tab for engaging the peripheral recess on the shaft, wherein the flexible finger extends laterally across a face of the hub, with the locking tab flaring inwards from a tip of the flexible finger, and the flexible finger further includes a shaped handle extending outwards from the tip of the flexible finger for lifting the locking tab out of engagement with the peripheral recess, the component further comprising a rim connected to the hub, the rim having a continuous periphery for contacting a conveyor belt.

14. The conveyor assembly of claim 13, further comprising a sheath surrounding the flexible finger and providing clearance to allow vertical movement of the flexible finger.

15. The conveyor assembly of claim 14, wherein the sheath forms a grasping ledge aligned with the shaped handle.

16. The conveyor assembly of claim 15, further comprising a tool for squeezing together the grasping ledge and the shaped handle to lift the locking tab out of engagement with the peripheral recess.

17. The conveyor assembly of claim 13, wherein the axially-extending shaft includes a plurality of peripheral recesses in the first face.

18. A component for a conveyor, comprising:
- a hub for receiving a shaft, the hub including a flexible finger with a locking tab for engaging a recess on the shaft and a lifting handle extending away from the locking tab at a tip of the flexible finger; and
- a rim connected to the hub, the rim having a continuous periphery for contacting a conveyor belt.

19. A component for a conveyor, comprising:

a hub for receiving a shaft, the hub including a flexible finger with a locking tab for engaging a recess on the shaft, wherein the locking tab flares from a tip of the flexible finger, the locking tab including a flat-rectangular-shaped bottom surface, flat front and rear surfaces, a first angled side wall extending at an angled from the tip of the flexible finger and a second curving side wall that flares from the flexible finger; and a rim connected to the hub, the rim having a continuous periphery for contacting a conveyor belt.

* * * * *